United States Patent
Lee et al.

(10) Patent No.: US 12,512,170 B2
(45) Date of Patent: Dec. 30, 2025

(54) METHOD OF DETERMINING AND PREPROGRAMMING OVER-ERASES GROUPS OF MEMORY CELLS

(71) Applicant: SAMSUNG ELECTRONICS CO., LTD., Suwon-si (KR)

(72) Inventors: Yohan Lee, Suwon-si (KR); Jaeduk Yu, Suwon-si (KR); Sangsoo Park, Suwon-si (KR); Yonghyuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/385,185

(22) Filed: Oct. 30, 2023

(65) Prior Publication Data

US 2024/0290401 A1 Aug. 29, 2024

(30) Foreign Application Priority Data

Feb. 24, 2023 (KR) .................. 10-2023-0024729

(51) Int. Cl.
*G11C 16/34* (2006.01)
*G11C 16/04* (2006.01)
*G11C 16/08* (2006.01)

(52) U.S. Cl.
CPC ........ *G11C 16/345* (2013.01); *G11C 16/0433* (2013.01); *G11C 16/08* (2013.01)

(58) Field of Classification Search
CPC ... G11C 16/345; G11C 16/0433; G11C 16/08; G11C 16/0483; G11C 16/10; G11C 16/3409; G11C 16/30
See application file for complete search history.

(56) References Cited

U.S. PATENT DOCUMENTS

| 8,582,363 B2 | 11/2013 | Lee |
| 8,879,318 B2 | 11/2014 | Ahn et al. |
| 9,047,970 B2 | 6/2015 | Wan et al. |
| 10,490,284 B2 | 11/2019 | Lee et al. |

(Continued)

FOREIGN PATENT DOCUMENTS

KR 10-2012-0098317 A 9/2012

OTHER PUBLICATIONS

S. C. Chong, L. Xie, H. Li and S. H. Lim, "Development of Multi-Die Stacking with Cu—Cu interconnects using Gang Bonding Approach," 2020 IEEE 70th Electronic Components and Technology Conference (ECTC), Orlando, FL, USA, 2020, pp. 188-193, doi: 10.1109/ECTC32862.2020.00042. (Year: 2020).*

(Continued)

*Primary Examiner* — Amir Zarabian
*Assistant Examiner* — Bradley S Coon
(74) *Attorney, Agent, or Firm* — Sughrue Mion, PLLC

(57) ABSTRACT

A method of controlling a nonvolatile memory device, includes: determining, based on a write address, whether selected memory cells of the nonvolatile memory device corresponding to the write address are included in an over-erased group; based on the selected memory cells being included in the over-erased group, performing a preprogram operation to increase threshold voltages of an over-erased state of the selected memory cells; and after completion of the preprogram operation, performing a data program operation to store write data in the selected memory cells.

18 Claims, 29 Drawing Sheets

(56) References Cited

U.S. PATENT DOCUMENTS

| | | | |
|---|---|---|---|
| 10,665,303 | B1 | 5/2020 | Lee et al. |
| 10,818,366 | B2 | 10/2020 | Dunga et al. |
| 11,127,465 | B2 | 9/2021 | Lee |
| 2013/0301360 | A1* | 11/2013 | Winter ............... G11C 16/3459 365/185.22 |
| 2020/0251168 | A1* | 8/2020 | Shirakawa ......... G11C 16/3459 |
| 2021/0104280 | A1 | 4/2021 | Lee et al. |
| 2022/0036954 | A1* | 2/2022 | Yu ....................... G11C 11/5628 |

OTHER PUBLICATIONS

Communication issued May 22, 2024 by the European Patent Office in European Patent Application No. 23207019.3.

\* cited by examiner

FIG. 4

| | S1 | S2 | S3 | S4 | S5 | S6 | S7 | S8 |
|---|---|---|---|---|---|---|---|---|
| LSB | 1 | 0 | 0 | 0 | 0 | 1 | 1 | 1 |
| CSB | 1 | 1 | 0 | 0 | 1 | 1 | 0 | 0 |
| MSB | 1 | 1 | 1 | 0 | 0 | 0 | 0 | 1 |

VR1 VR2 VR3 VR4 VR5 VR6 VR7

SBM

| B7 | B6 | SSLs |
|----|----|------|
| 1  | 1  | SSL3 |
| 1  | 0  | SSL2 |
| 0  | 1  | SSL1 |
| 0  | 0  | SSL0 |

FIG. 20B

| B5 | B4 | B3 | B2 | B1 | B0 | WLs |
|----|----|----|----|----|----|------|
| 1  | 1  | 1  | 1  | 1  | 1  | WL63 |
| 1  | 1  | 1  | 1  | 1  | 0  | WL62 |
| ⋮  | ⋮  | ⋮  | ⋮  | ⋮  | ⋮  | ⋮    |
| 0  | 0  | 0  | 1  | 0  | 0  | SSL4 |
| 0  | 0  | 0  | 0  | 1  | 1  | SSL3 |
| 0  | 0  | 0  | 0  | 1  | 0  | SSL2 |
| 0  | 0  | 0  | 0  | 0  | 1  | SSL1 |
| 0  | 0  | 0  | 0  | 0  | 0  | SSL0 |

METHOD OF DETERMINING AND PREPROGRAMMING OVER-ERASES GROUPS OF MEMORY CELLS

CROSS-REFERENCE TO RELATED APPLICATION

This application claims priority under 35 U.S.C. § 119 to Korean Patent Application No. 10-2023-0024729, filed on Feb. 24, 2023, in the Korean Intellectual Property Office, the disclosure of which is incorporated by reference herein in its entirety.

BACKGROUND

1. Technical Field

Example embodiments relate generally to semiconductor integrated circuits, and more particularly to a nonvolatile memory device and a method of controlling a nonvolatile memory device.

2. Discussion of the Related Art

Semiconductor memory devices for storing data may be classified into volatile memory devices and nonvolatile memory devices. Volatile memory devices, such as dynamic random access memory (DRAM) devices, are typically configured to store data by charging or discharging capacitors in memory cells, and lose the stored data when power is off. Nonvolatile memory devices, such as flash memory devices, may maintain stored data even though power is off. Volatile memory devices are widely used as main memories of various apparatuses, while nonvolatile memory devices are widely used for storing program codes and/or data in various electronic devices, such as computers, mobile devices, etc.

Recently, nonvolatile memory devices including three-dimensional structures such as vertical NAND memory devices have been developed to increase the degree of device integration and memory capacity of the nonvolatile memory devices. Along with increases in the integration degree and memory capacity, interference or disturbance between memory cells may increase and retention characteristics of the memory cells may be degraded.

SUMMARY

Some example embodiments may provide a nonvolatile memory device and a method of controlling a nonvolatile memory device, capable of efficiently enhancing the retention characteristics of the nonvolatile memory device.

According to an aspect of an example embodiment, a method of controlling a nonvolatile memory device, includes: determining, based on a write address, whether selected memory cells of the nonvolatile memory device corresponding to the write address are included in an over-erased group: based on the selected memory cells being included in the over-erased group, performing a preprogram operation to increase threshold voltages of an over-erased state of the selected memory cells; and after completion of the preprogram operation, performing a data program operation to store write data in the selected memory cells.

According to an aspect of an example embodiment, a nonvolatile memory device includes: a memory cell array including a plurality of memory cells; and a control circuit configured to: based on selected memory cells corresponding to a write address being included in an over-erased group, perform a preprogram operation to increase threshold voltages of an over-erased state of the selected memory cells, and after performing the preprogram operation, performing a data program operation to store write data in the selected memory cells.

According to an aspect of an example embodiment, a nonvolatile memory device includes: a plurality of first bonding metal patterns disposed in a cell region: a plurality of second bonding metal patterns disposed in a peripheral region disposed under the cell region, wherein the peripheral region is vertically coupled to the cell region by the plurality of first bonding metal patterns and the plurality of second bonding metal patterns: a memory cell array disposed in the cell region, the memory cell array including a plurality of memory cells; and a control circuit disposed in the peripheral region, the control circuit being configured to: based on selected memory cells corresponding to a write address being included in an over-erased group, perform a preprogram operation to increase threshold voltages of an over-erased state of the selected memory cells, and after performing the preprogram operation, performing a data program operation to store write data in the selected memory cells.

The nonvolatile memory device and a method of controlling a nonvolatile memory device according to one or more example embodiments may effectively reduce disturbance between the memory cells and enhance the retention characteristics of the nonvolatile memory device, by performing the preprogram operation with selecting over-erased memory cells before performing the data program operation. Reliability of the nonvolatile memory device may be efficiently improved without deterioration in performance of the nonvolatile memory device by performing the preprogram operation while write data is transferred and state-bit mapping is performed.

BRIEF DESCRIPTION OF THE DRAWINGS

Example embodiments of the present disclosure will be more clearly understood from the following detailed description taken in conjunction with the accompanying drawings, in which:

FIG. 4 is a diagram illustrating an example of state-bit mapping information indicating mapping relationship between states in FIG. 3 and bit values.

FIGS. 19, 20A and 20B are diagrams illustrating bits of a physical address of a nonvolatile memory device according to example embodiments.

DETAILED DESCRIPTION

Figure 1:
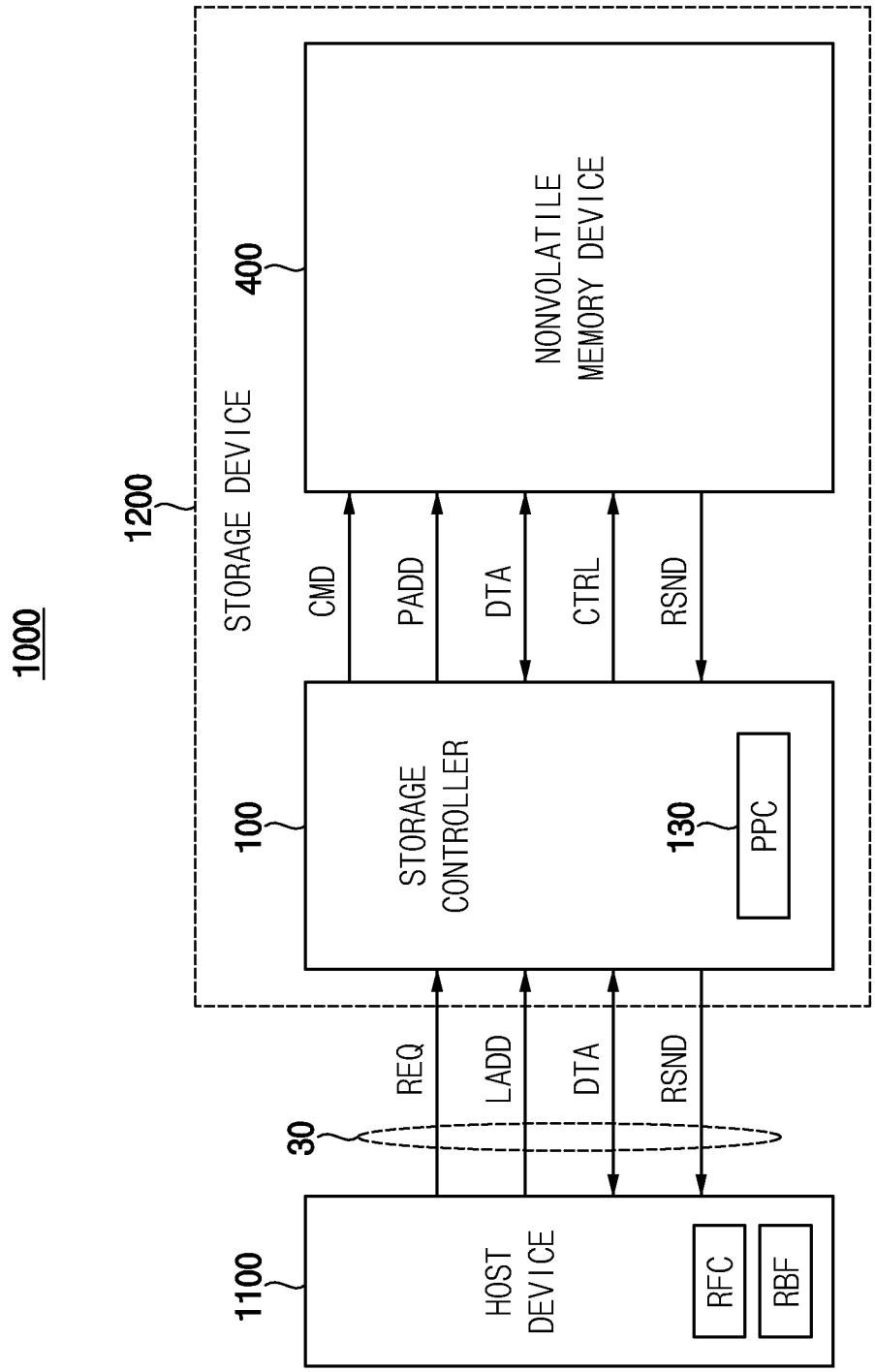
FIG. 1 is a block diagram illustrating a storage system according to one or more example embodiments.

Various example embodiments will be described more fully hereinafter with reference to the accompanying drawings. In the drawings, like numerals refer to like elements throughout. The repeated descriptions may be omitted.

Figure 2:
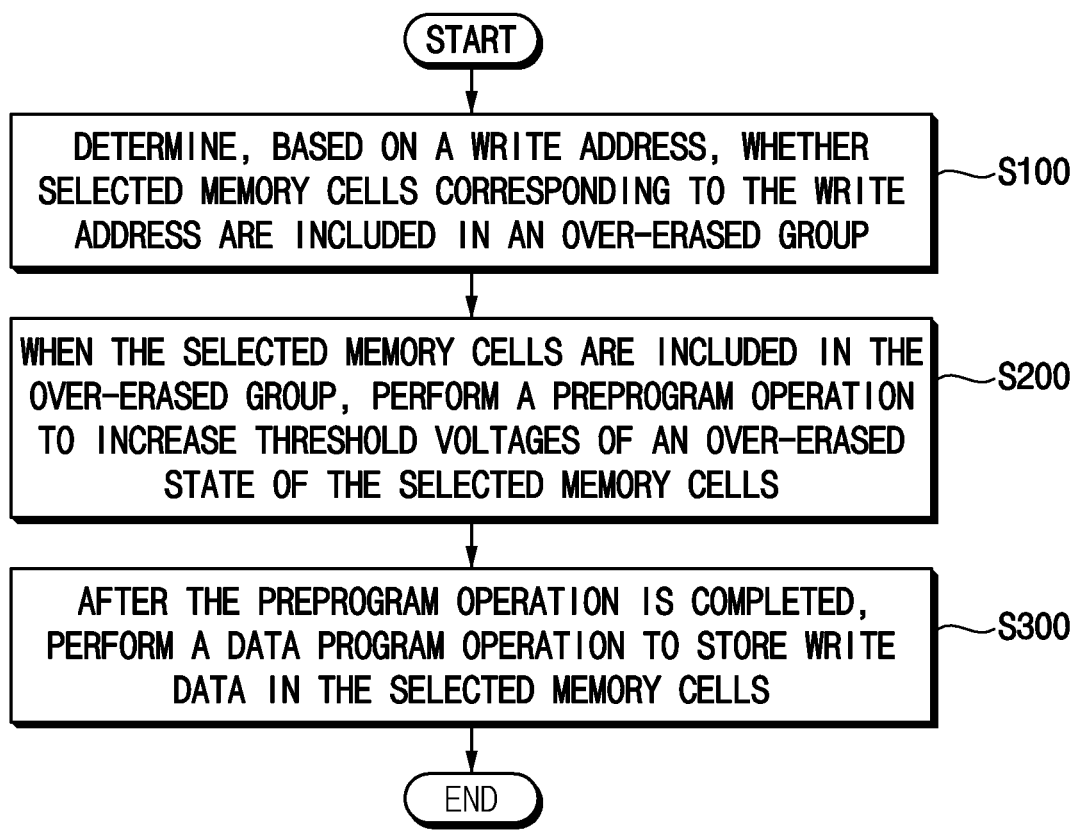
FIG. 2 is a flowchart illustrating a method of controlling a nonvolatile memory device according to one or more example embodiments.

FIG. 1 is a block diagram illustrating a storage system according to one or more example embodiments, and FIG. 2 is a flowchart illustrating a method of controlling a nonvolatile memory device according to one or more example embodiments.

Referring to FIG. 1, a storage system 1000 may include a host device 1100, a storage device 1200 and a link 30 connecting the host device 1100 and the storage device 1200. The storage device 1200 may include a storage controller 100 and a nonvolatile memory device 400. The storage controller 100 may include a preprogram controller PPC 130. For example, the storage device 1200 may be a solid state drive (SSD), an embedded multimedia card (eMMC), a universal flash storage (UFS), or the like. The link 30 may be a PCIe link.

The host device 1100 may be or include a data processing device such as a central processing unit (CPU), a microprocessor, an application processor (AP), or the like. The storage device 1200 may be embedded with the host device 1100 in an electronic device, or the storage device 1200 may be detachable to an electronic device including the host device 1100.

The host device 1100 may transfer a data operation request (which may be referred to herein as simply a request) REQ and associated logical addresses LADD to the storage controller 100 to communicate data DTA with the storage controller 100. The storage controller 100 may transfer a response RSND with respect to the request REQ to the host device 1100. The request REQ may include a read request, a program request, and/or an erase request, respectively associated with one or more read operations, program operations, and/or erase operations. The program request may be referred to as a write request.

The storage controller 100 may control the nonvolatile memory device 400 based on the request REQ. The storage controller 100 may provide physical addresses ADDR, commands CMD, and control signals CTRL to perform the read operations, the program operations, and/or the erase operations. The program operation may be referred to as a write operation. For example, the storage controller 100 may convert the logical addresses LADD from the host device 1100 to the physical addresses PADD by performing flash translation layer (FTL) operations.

The storage controller 100 may control the nonvolatile memory device 400 to read data DTA stored in the nonvolatile memory device 400 in response to the read request received from the host device 1100. The storage controller 100 may control the nonvolatile memory device 400 to write or program data DTA in the nonvolatile memory device 400 in response to the write or program request received from the host device 1100. The storage controller 100 may control the nonvolatile memory device 400 to erase data stored in the nonvolatile memory device 400 in response to the erase request received from the host device 1100. The nonvolatile memory device 400 may transfer a response RSND to the storage controller 100 in response to the command CMD.

The nonvolatile memory device 400 may be implemented with nonvolatile memory such as flash memory, MRAM (Magnetic RAM), FeRAM (Ferroelectric RAM), PRAM (Phase change RAM), ReRAM (Resistive RAM), or the like. The nonvolatile memory device 400 may be connected to the storage controller 100 through a plurality of channels. Hereinafter, some example embodiments will be described based on NAND flash memory, but example embodiments are not limited to any particular kind of nonvolatile memory.

Referring to FIGS. 1 and 2, the preprogram controller 130 may determine, based on a write address, whether selected memory cells corresponding to the write address are included in an over-erased group (S200). Here, the write address may correspond to the physical address PADD of the nonvolatile memory device 400.

An over-erased group refers to a set of memory cells that are likely to be excessively erased during an erase operation and/or a set of memory cells that have relatively large interference or disturbance between adjacent memory cells after a program operation is completed. An over-erased group may be set according to various criteria. In an example embodiment, the preprogram controller 130 may determine whether the selected memory cells are included or correspond to the over-erased group based on the physical locations of the selected memory cells, that is, based on the physical address PADD for a write operation. Example embodiments of setting an over-erased group will be described below with reference to FIGS. 24 through 28.

When the selected memory cells are included in the over-erased group, the nonvolatile memory device 400 may perform, under control of the storage controller 100, a preprogram operation to increase threshold voltages of an over-erased state of the selected memory cells (S200). In an example embodiment, the storage controller 100 may transfer the physical address PADD to the nonvolatile memory device 400 together with a command CMD and/or a control signal CTRL indicating a preprogram operation. The nonvolatile memory device 400 may perform the preprogram operation on the physical address PADD corresponding to the write address according to a preset operating condition. Since the preprogram operation is performed to increase threshold voltages of the over-erased memory cells, the preprogram operation may be performed regardless of write data.

After the preprogram operation is completed, the nonvolatile memory device 400 may perform a data program operation to store write data in the selected memory cells (S300).

When the selected memory cells are not included in the over-erased group, the nonvolatile memory device 400 may omit the preprogram operation and perform only the data program operation, under control of the storage controller 100.

FIG. 2 illustrates logic for performing a preprogram operation. At operation S100, the logic determines, based on a write address, whether selected memory cells corresponding to the write address are in included in an over-erased group.

At operation S200, when the selected memory cells are included in the over-erased group, the logic performs a preprogram operation to increase threshold voltages of an over-erased state of the selected memory cells.

Figure 3:
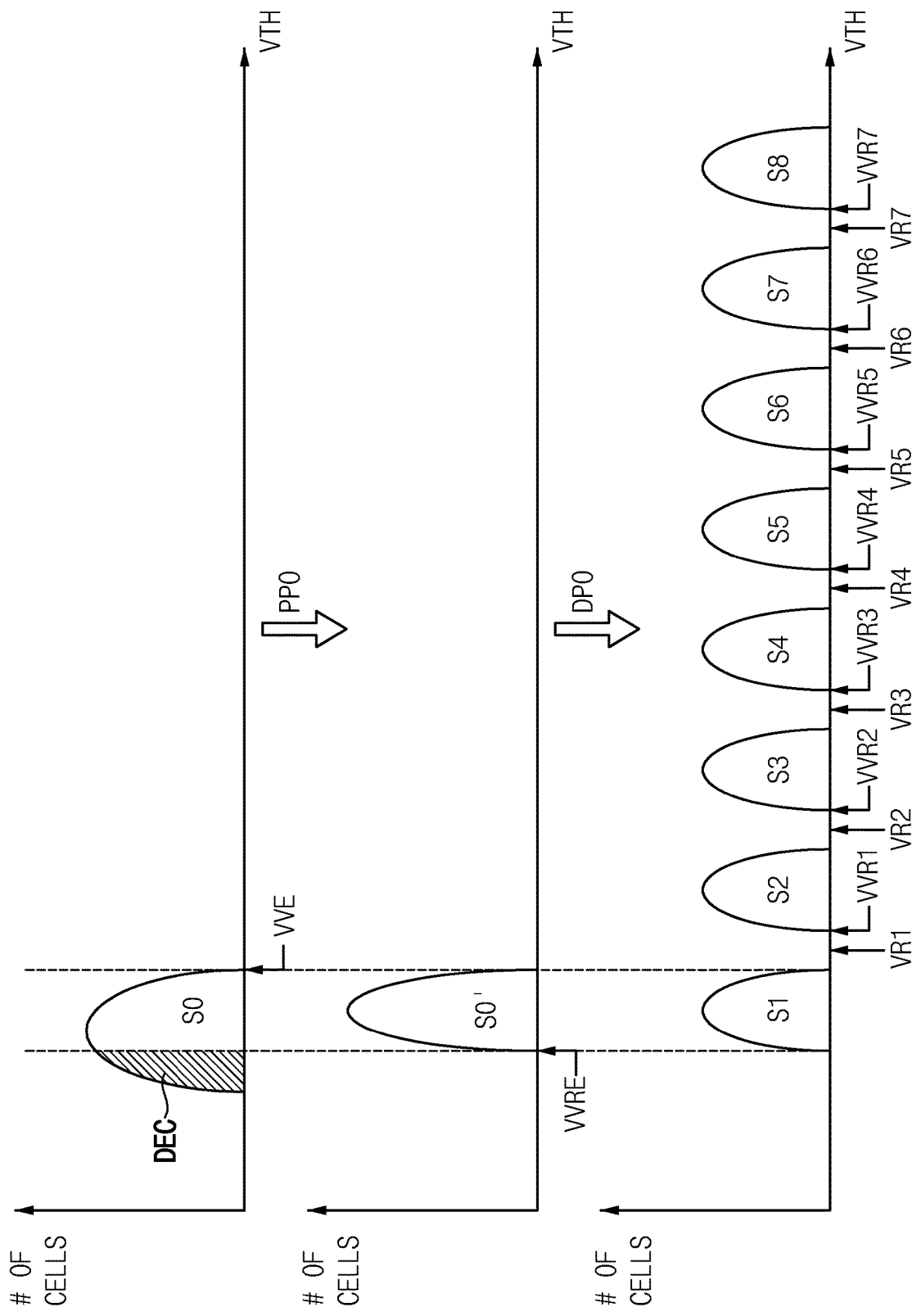
FIG. 3 is a diagram illustrating state change by a preprogram operation and a data program operation in a method of controlling a nonvolatile memory device according to one or more example embodiments.

At operation S300, after the preprogram operation is completed, the logic performs a data program operation to store write data in the selected memory cells. FIG. 3 is a diagram illustrating state change by a preprogram operation and a data program operation in a method of controlling a nonvolatile memory device according to one or more example embodiments.

In FIG. 3, a horizontal axis represents a threshold voltage VTH of selected memory cells, and a vertical axis represents the number of selected memory cells corresponding to the threshold voltage VTH. Although FIG. 3 shows a triple level cell (TLC) scheme in which each selected memory cell stores a 3-bit value, example embodiments are not limited thereto, and the number of bits stored in each selected memory cell may be determined variously.

Referring to FIG. 3, the selected memory cells may be erased to have threshold voltages lower than an erase verify voltage VVE. Here, some memory cells among the selected memory cells may be excessively erased and have too low threshold voltages, and these memory cells may be referred to as over-erased memory cells DEC.

The threshold voltages of the over-erased memory cells DEC may be increased higher than the pre-verification read voltage VVRE by the preprogram operation PPO (see VVR1, VVR2, VVR3, VVR4, VVR5, VVR6 and VVR7). As a result, as shown in FIG. 3, the erase state S0'after the preprogram operation PPO may have a narrower threshold voltage range than the erase state S0 before the preprogram operation PPO.

After that, a data program operation DPO may be performed such that each selected memory cell corresponds to one state depending on the write data among the first through eighth states S1~S8. Here, the first state S1 corresponds to an unprogrammed erase state. During the data program operation, the program execution results for the first through eighth states S1~S8 may be determined by sequentially applying the first through seventh data verification read voltages VVR1, VVR2, VVR3, VVR4, VVR5, VVR6 and VVR7 to the selected wordline. Also, during the read operation, each bit of the first through eighth states S1, S2, S3, S4, S5, S6, S7, and S8 may be determined by sequentially applying some of the normal read voltages VR1~VR7 to the selected wordline.

FIG. 4 is a diagram illustrating an example of state-bit mapping information indicating mapping relationship between states in FIG. 3 and bit values.

Referring to FIG. 4, state-bit mapping information SBM may indicate the mapping relationships between the states and the bits stored in the plurality of multi-level cells. FIG. 4 illustrates an example of bit values corresponding to the first through eighth states S1~S8 in FIG. 3. The first through eighth states S1~S8 may be represented by different values corresponding to least significant bit (LSB), a centered bit (CSB) and a most significant bit (MSB), that is, different values of first, second and third bits LSB, CSB and MSB. For example, as illustrated in FIG. 4, the first state S1 corresponds to '111', the second state S2 corresponds to '110', the third state S3 corresponds to '100', the fourth state S4 corresponds to '000', the fifth S5 state corresponds to '010', the sixth S6 state corresponds to '011', the seventh state S7 corresponds to '001', and the eighth state S8 corresponds to '101'. According to one or more example embodiments, each reliability of the read bits may be adjusted based on the state-bit mapping information SBM.

In this case, the first bit LSB may be determined using the first read voltage VR1 and the fifth read voltage VR5, the second bit CSB may be determined using the second read voltage VR2, the fourth read voltage V4 and the sixth read voltage VR6, and the third bit MSB may be determined using the third read voltage VR3 and the seventh read voltage VR7.

In the over-erased state, holes are accumulated in the charge storage layer of the memory cell, and the holes caused by the over-erase may spread to the surroundings as time elapses. The diffused holes combine with electrons stored in the programmed memory cell to distort the threshold voltage distribution of the programmed memory cell. As a result, as the number of over-erased memory cells increases after the write operation is completed, retention characteristics of the nonvolatile memory device deteriorate.

According to one or more example embodiments, the number of the over-erased memory cells may be reduced by performing the preprogram operation PPO with respect to the selected memory cells corresponding to an over-erased group. By selecting over-erased memory cells and performing the preprogram operation PPO before performing a data program operation, disturbance between memory cells may be efficiently reduced and retention characteristics of the nonvolatile memory device may be improved.

Figure 5:
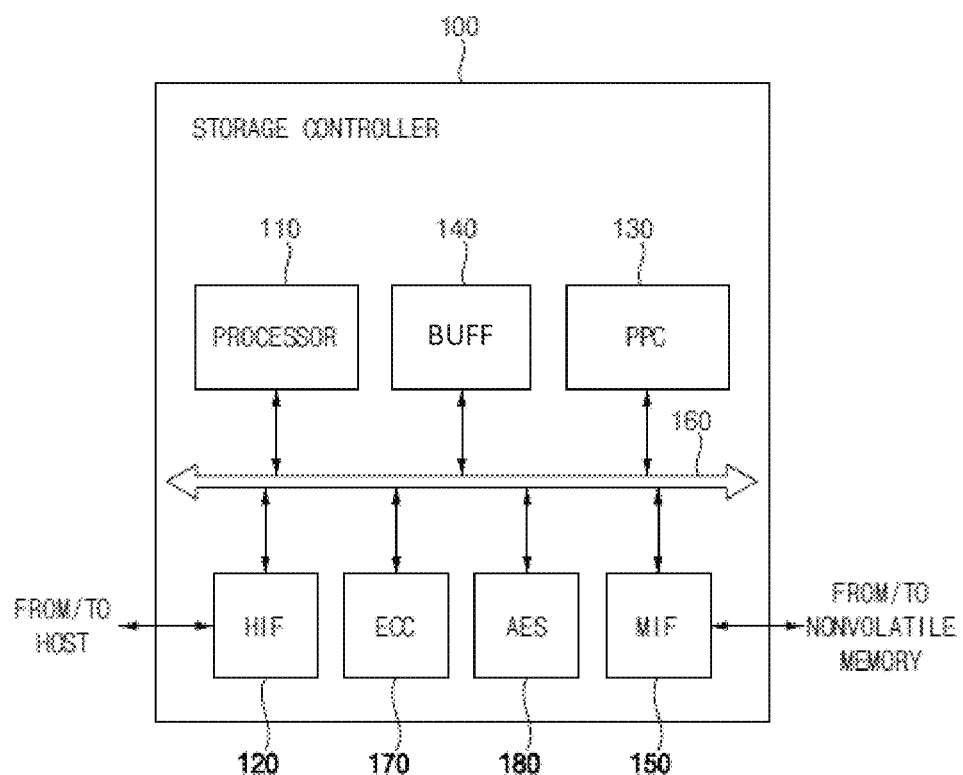
FIG. 5 is a block diagram illustrating a storage controller according to one or more example embodiments.

FIG. 5 is a block diagram illustrating a storage controller according to one or more example embodiments.

Referring to FIG. 5, a storage controller 100 may include a processor 110, a buffer memory (BUFF) 140, a preprogram controller (PPC) 130, a host interface (HIF) 120, an error correction code (ECC) engine 170, a memory interface (MIF) 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 1100 in FIG. 1). For example, the processor 110 may control an operation of a storage device (e.g., the storage device 1200 in FIG. 1), and may control respective components by employing firmware for operating the storage device.

The buffer memory 140 may store instructions and data executed and processed by the processor 110. For example, the buffer memory 140 may be implemented with a volatile memory, such as a DRAM, a SRAM, a cache memory, or the like.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some example embodiments, the ECC engine 170 may perform ECC encoding and ECC decoding using above-described codes or other error correction codes.

The host interface 120 may provide physical connections between the host device 1100 and the storage device 1200. The host interface 120 may provide an interface that corresponds to a bus format of the host device 1100 for communication between the host device 1100 and the storage device 1200. In some example embodiments, the bus format of the host device 1100 may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface 150 may exchange data with a nonvolatile memory device (e.g., the nonvolatile memory device 400 in FIG. 1). The memory interface 150 may transfer data to the nonvolatile memory device 400, and/or may receive data read from the nonvolatile memory device 400. In some example embodiments, the memory interface 150 may be connected to the nonvolatile memory device 400 via one channel. In other example embodiments, the memory interface 150 may be connected to the nonvolatile memory device 400 via two or more channels. The memory interface 150 may be configured to comply with a standard protocol, such as Toggle or open NAND flash interface (ONFI).

The AES engine 180 may perform at least one of an encryption operation and a decryption operation on data input to the storage controller 100 using a symmetric-key algorithm. The AES engine 180 may include an encryption module and a decryption module. For example, the encryption module and the decryption module may be implemented as separate modules. In another example, one module capable of performing both encryption and decryption operations may be implemented in the AES engine 180.

The preprogram controller 130 may determine, based on the write address, whether the selected memory cells corresponding to the write address are included in the over-erased group. The preprogram controller 130 may control the nonvolatile memory device to perform the preprogram operation to increase the over-erased threshold voltages of the selected memory cells when the selected memory cells belong to the over-erased group.

Figure 6:
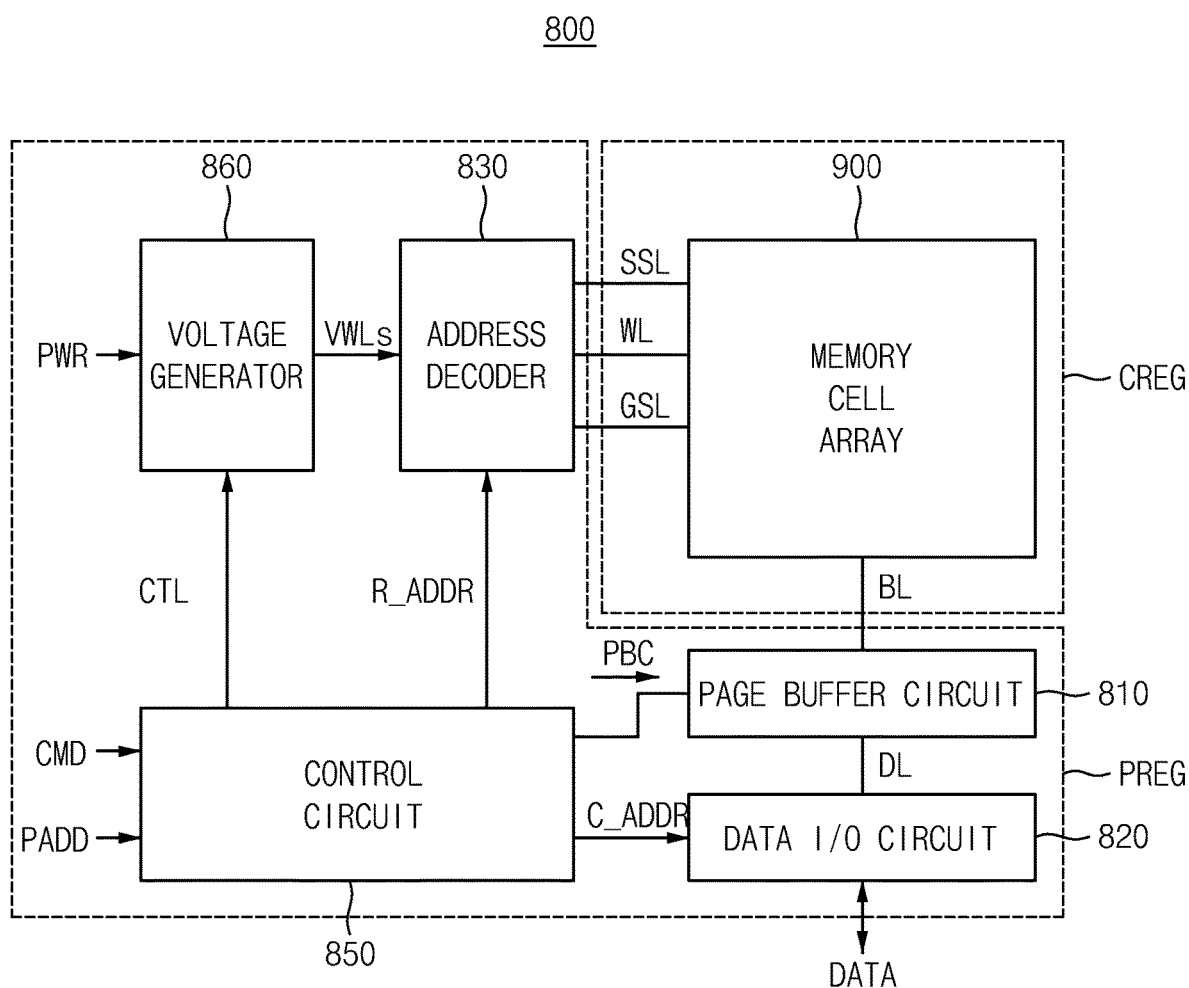
FIG. 6 is a block diagram illustrating a nonvolatile memory device according to one or more example embodiments.

FIG. 6 is a block diagram illustrating a nonvolatile memory device according to one or more example embodiments.

Referring to FIG. 6, a nonvolatile memory device 800 may include a memory cell array 900, a page buffer circuit 810, a data input/output (I/O) circuit 820, an address decoder 830, a control circuit 850, and a voltage generator 860. In some example embodiments, the nonvolatile memory device 800 may have a cell over periphery (COP) structure in which a memory cell array is arranged over peripheral circuits. In this case, the memory cell array 900 may be formed in a cell region CREG, and the page buffer circuit 810, the data I/O circuit 820, the address decoder 830, the control circuit 850, and the voltage generator 860 may be formed in a peripheral region PREG.

The memory cell array 900 may be coupled to the address decoder 830 through string selection lines SSL, wordlines WL, and ground selection lines GSL. The memory cell array 900 may be coupled to the page buffer circuit 810 through a bitlines BL. The memory cell array 900 may include memory cells coupled to the wordlines WL and the bitlines BL. In some example embodiments, the memory cell array 900 may be a three-dimensional memory cell array, which may be formed on a substrate in a three-dimensional structure (or a vertical structure). In this case, the memory cell array 900 may include cell strings (e.g., NAND strings) that are vertically oriented such that at least one memory cell is located over another memory cell.

The control circuit 850 may receive a command signal CMD and an address signal PADD from a memory controller, and may control erase, program, and read operations of the nonvolatile memory device 800 in response to (or based on) at least one of the command signal CMD and the address signal PADD. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some example embodiments, the control circuit 850 may generate a control signals CTL used to control the operation of the voltage generator 860, and may generate a page buffer control signal PBC for controlling the page buffer circuit 810, based on the command signal CMD, and may generate a row address R_ADDR and a column address C_ADDR based on the address signal PADD. The control circuit 850 may provide the row address R_ADDR to the address decoder 530, and may provide the column address C_ADDR to the data I/O circuit 520.

The address decoder 830 may be coupled to the memory cell array 900 through the string selection lines SSL, the wordlines WL, and the ground selection lines GSL.

Hereinafter, a program operation may be understood to include both of the preprogram operation PPO and the data program operation DPO as described above.

During the program operation or the read operation, the address decoder 530 may determine (or select) one of the wordlines WL as a selected wordline, and may determine or designate the remaining wordlines WL other than the selected wordline as unselected wordlines based on the row address R_ADDR.

In addition, during the program operation or the read operation, the address decoder 830 may determine one of the string selection lines SSL as a selected string selection line and determine or designate the remaining the string selection lines SSL other than the selected string selection line as unselected string selection lines based on the row address R ADDR. The aforementioned selected memory cells correspond to the memory cells connected to the selected wordline and the selected string selection line.

The voltage generator 860 may generate wordline voltages VWL, which are used for the operation of the memory cell array 900 of the nonvolatile memory device 800, based on the control signals CTL. The voltage generator 860 may receive the power PWR from the memory controller. The wordline voltages VWL may be applied to the wordlines WL through the address decoder 830.

In some example embodiments, during the erase operation, the voltage generator 860 may apply an erase voltage to a well and/or a common source line of a memory block, and may apply an erase permission voltage (e.g., a ground voltage) to all of the wordlines of the memory block or a portion of the wordlines based on an erase address. During the erase verification operation, the voltage generator 860 may apply an erase verification voltage simultaneously to all of the wordlines of the memory block or sequentially (e.g., one by one) to the wordlines.

In some example embodiments, during the program operation, the voltage generator 860 may apply a program voltage to the selected wordline, and may apply a program pass voltage to the unselected wordlines. During the program verification operation, the voltage generator 860 may apply a program verification voltage to the first wordline, and may apply a verification pass voltage to the unselected wordlines.

During the normal read operation, the voltage generator 860 may apply a read voltage to the selected wordline, and may apply a read pass voltage to the unselected wordlines. During the data recover read operation, the voltage generator 860 may apply the read voltage to a wordline adjacent to the selected wordline, and may apply a recover read voltage to the selected wordline.

The page buffer circuit 810 may be coupled to the memory cell array 900 through the bitlines BL. The page buffer circuit 810 may include multiple buffers. In some example embodiments, each buffer may be connected to only a single bitline. In some example embodiments, each buffer may be connected to two or more bitlines. The page buffer circuit 810 may temporarily store data to be programmed in a selected page or data read out from the selected page of the memory cell array 900.

The data I/O circuit 820 may be coupled to the page buffer circuit 810 through data lines DL. During the program operation, the data I/O circuit 820 may receive program data received from the memory controller and provide the program data to the page buffer circuit 810 based on the column address C_ADDR received from the control circuit 850. During the read operation, the data I/O circuit 820 may provide read data, having been read from the memory cell array 900 and stored in the page buffer circuit 810, to the memory controller based on the column address C_ADDR received from the control circuit 850.

The page buffer circuit 810 and the data I/O circuit 820 may read data from a first area of the memory cell array 900, and may write this read data to a second area of the memory cell array 900 (e.g., without transmitting the data to a source external to the nonvolatile memory device 800, such as to the memory controller). Thus, the page buffer circuit 810 and the data I/O circuit 820 may perform a copy-back operation.

Figure 7:
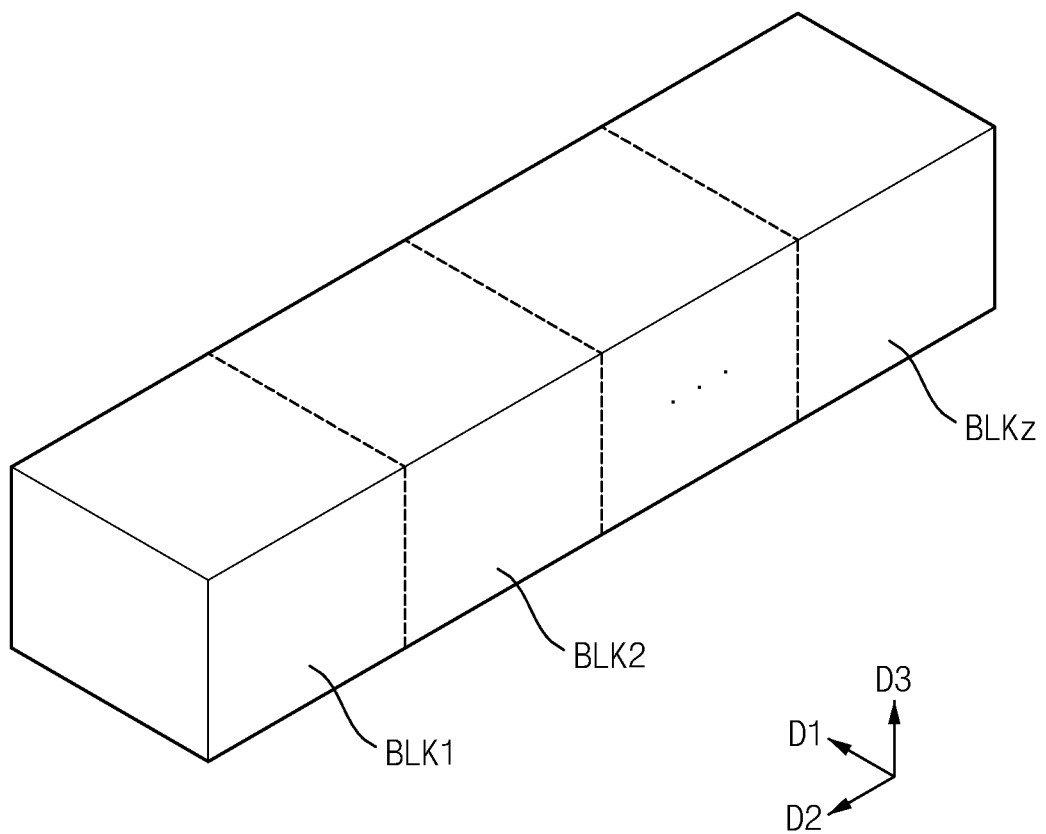
FIG. 7 is a block diagram illustrating a memory cell array included in the nonvolatile memory device of FIG. 6.
Figure 8:
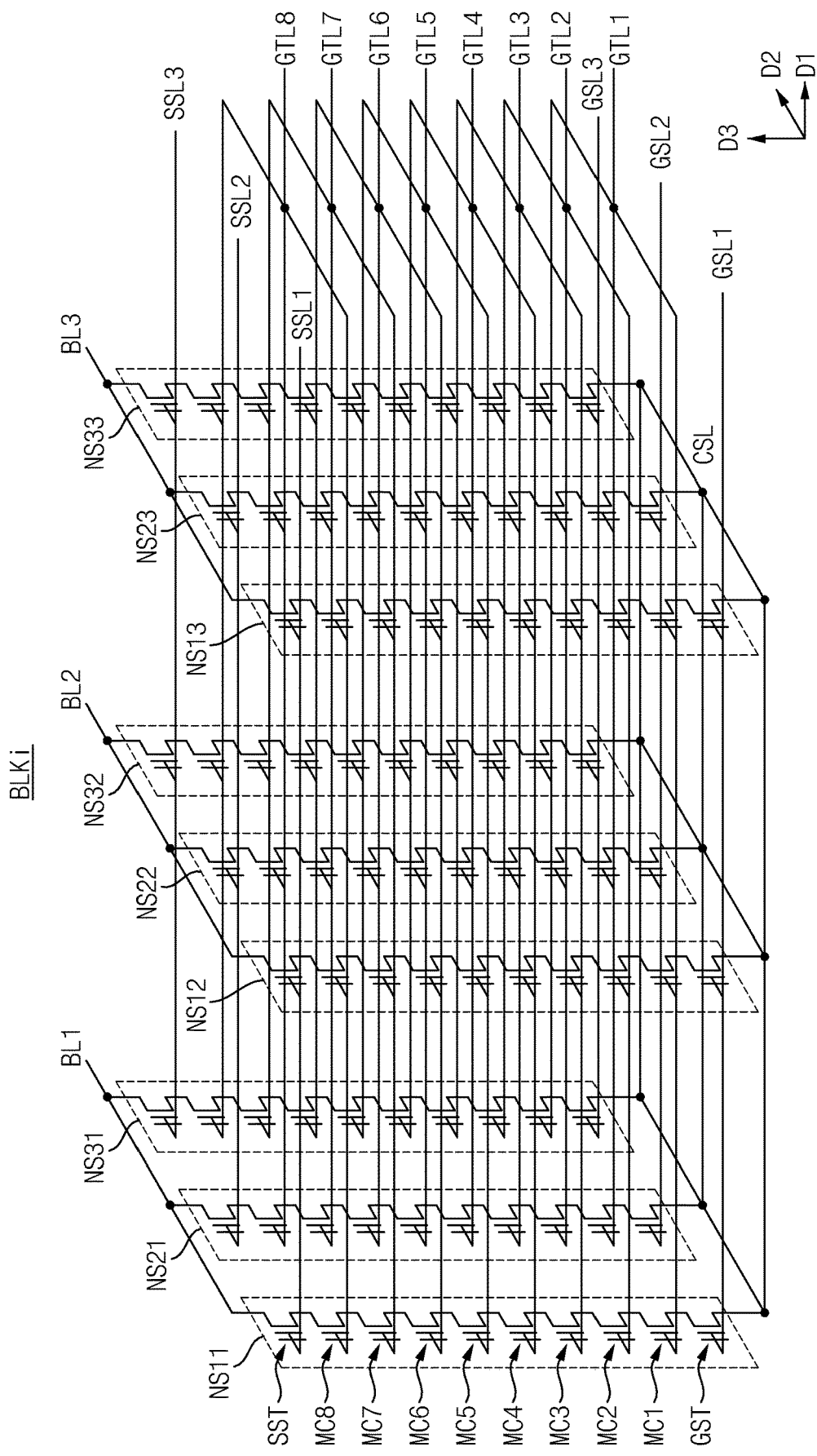
FIG. 8 is a circuit diagram illustrating an equivalent circuit of a memory block included in the memory cell array of FIG. 7.

FIG. 7 is a block diagram illustrating a memory cell array included in the nonvolatile memory device of FIG. 6, and FIG. 8 is a circuit diagram illustrating an equivalent circuit of a memory block included in the memory cell array of FIG. 7.

Referring to FIG. 7, the memory cell array 900 may include memory blocks BLK1 to BLKz. In some example embodiments, the memory blocks BLK1 to BLKz may be selected by the address decoder 830 of FIG. 6. For example, the address decoder 830 may select a particular memory block BLK corresponding to a block address among the memory blocks BLK1 to BLKz.

A memory block BLKi of FIG. 8 may be formed on a substrate in a three-dimensional structure (or a vertical structure). For example, NAND strings or cell strings included in the memory block BLKi may be formed in a vertical direction D3 perpendicular to an upper surface of a substrate.

Referring to FIG. 8, the memory block BLKi may include NAND strings NS11 to NS33 coupled between bitlines BL1, BL2, and BL3 and a common source line CSL. Each of the NAND strings NS11 to NS33 may include a string selection transistor SST, memory cells MC1 to MC8, and a ground selection transistor GST. In FIG. 8, each of the NAND strings NS11 to NS33 is illustrated to include eight memory cells MC1 to MC8. However, example embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be commonly connected, and the ground selection lines GSL1 to GSL3 and the string selection lines SSL1 to SSL3 may be separated. In FIG. 8, the memory block BLKi is illustrated as being coupled to eight gate lines GTL1 to GTL8 and three bitlines BL1 to BL3. However, example embodiments are not limited thereto, and each memory block in the memory cell array 900 may be coupled to various numbers of wordlines and various numbers of bitlines.

Figure 9:
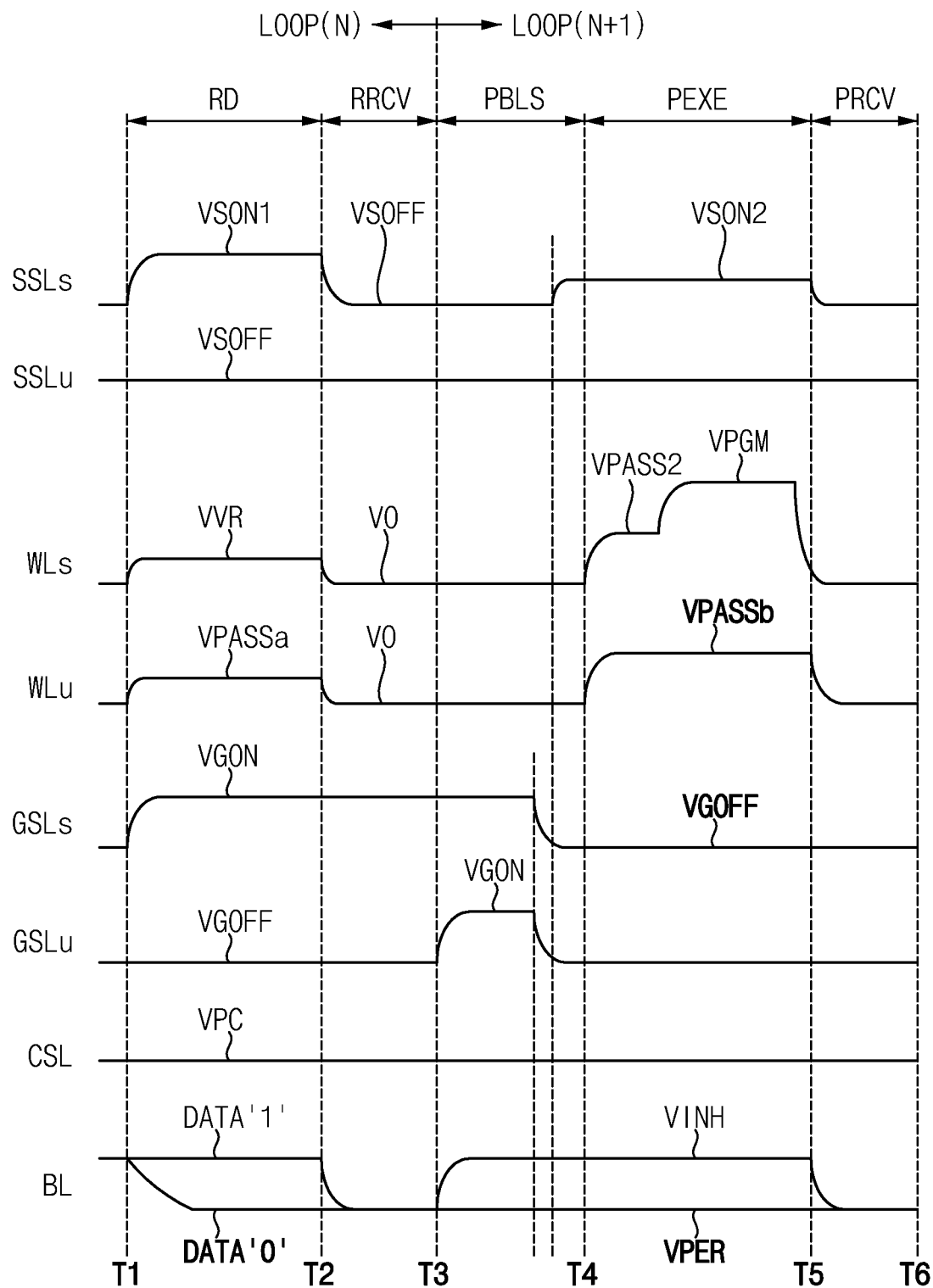
FIG. 9 is a timing diagram illustrating a method of programming a nonvolatile memory device according to one or more example embodiments.

FIG. 9 is a timing diagram illustrating a method of programming a nonvolatile memory device according to one or more example embodiments.

FIG. 9 illustrates a verification read period RD and a read recovery period RRCV of an N-th program loop LOOP(N) and a bitline setup period PBLS, a program execution period PEXE and a program recovery period PRCV of an (N+1)-th program loop LOOP (N+1). Time points T1~T6 represents boundaries of the periods.

Referring to FIG. 9, during the verification read period RD, a turn-on voltage VSON1 is applied to the selected string selection line SSLs and a turn-off voltage VSOFF is applied to an unselected string selection line SSLu. Thus a selected string selection transistor driven by the selected string selection line SSLs is turned on and an unselected string selection transistor driven by the unselected string selection line SSLu is turned off during the verification read period RD.

During the verification read period RD, a read pass voltage VPASSa is applied to an unselected wordline WLu and a verification read voltage VVR is applied to a selected wordline WLs. The read pass voltage VPASSa has a voltage level for turning on the memory cell regardless of its program state and the verification read voltage VVR has a voltage level for determining the threshold voltage level of a selected memory cell.

During the verification read period RD, a turn-on voltage VGON is applied to a selected ground selection line GSLs and a turn-off voltage VGOFF is applied to an unselected ground selection line GSLu. Thus a selected ground selection transistor driven by the selected ground selection line GSLs is turned on and an unselected ground selection transistor driven by the unselected ground selection line GSLu is turned off during the verification read period RD.

As a result, a voltage of a bitline is developed to a voltage corresponding to '1' or '0' depending on the threshold voltage state of the selected memory cell. The data stored in the selected memory cell may be determined by sensing the voltage development of the bitline. Even though not illustrated in FIG. 2, during a bitline precharge period before the verification read period RD, all of the bitlines may be initialized by the same bitline precharge voltage.

At the time point T2 of the end of the verification read period RD or the start of the read recovery period RRCV, the selected string selection line SSLs is recovered to the turn-off voltage VSOFF, the unselected wordline WLu and the selected wordline WLs are recovered to an initial voltage VO. In contrast, the turn-on voltage VGON of the selected ground selection line GSLs is not recovered and it is maintained at the time point T2 of the end of the verification read period RD.

The turn-on voltage VGON of the selected ground selection line GSLs may be maintained without recovery after the time point T3 of the start of the bitline setup period PBLS. Accordingly the channel of the selected cell string may be precharged or initialized to a precharge voltage VPC during the read recovery period RRCV and the bitline setup period PBLS while the selected ground selection transistor is turned on.

At the time point T3 of the start of the bitline setup period PBLS, the turn-on voltage VGON is applied to the unselected ground selection line GSLu. Thus the channel of the unselected cell string may be precharged or initialized to the precharge voltage VPC during the bitline setup period PBLS while the unselected ground selection transistor is turned on.

At the time point T3 of the start of the bitline setup period PBLS, a program inhibition voltage VINH or a program permission voltage VPER may be applied to the bitline BL depending on the value of the write data.

At the time point T4 of the start of the program execution period PEXE, a program pass voltage VPASSb is applied to the selected wordline WLs and the unselected wordline WLu. After a predetermined time interval, a program voltage VPGM is applied to the selected wordline WLs. During the program execution period PEXE, a turn-on voltage VSON2 is applied to the selected string selection line SSLs and the turn-off voltage VSOFF of the unselected string selection line SSLu is maintained. The turn-on voltage VSON2 during the program execution period PEXE may be lower than the turn-on voltage VSON1 during the verification read period RD.

The program pass voltage VPASSb applied to the unselected wordline WLu may be maintained until the time point T5 of the end of the program execution period PEXE. The channel voltage of the unselected cell strings connected to the unselected string selection line SSLu may be increased by a self-boosting effect.

The selected memory cells connected to the selected wordline WLs may be programmed by the program voltage VPGM applied to the selected wordline WLs depending on the setup voltage of the bitline BL. The unselected cell string maintain the boosted state while the program voltage VPGM is applied to the selected wordline WLs, and thus the programming of the memory cells of the unselected cell string connected to the selected wordline WLs may be prevented.

At the time point T5 of the end of the program execution period PEXE or the start of the program recovery period PRCV, the turn-on voltage VSON2 of the selected string selection line SSLs is recovered to the turn-off voltage VSOFF, and the program pass voltage VPASS2 of the unselected wordline WLu and the program voltage VPGM of the selected wordline WLs may be recovered to the initial voltage VO.

Figure 10:
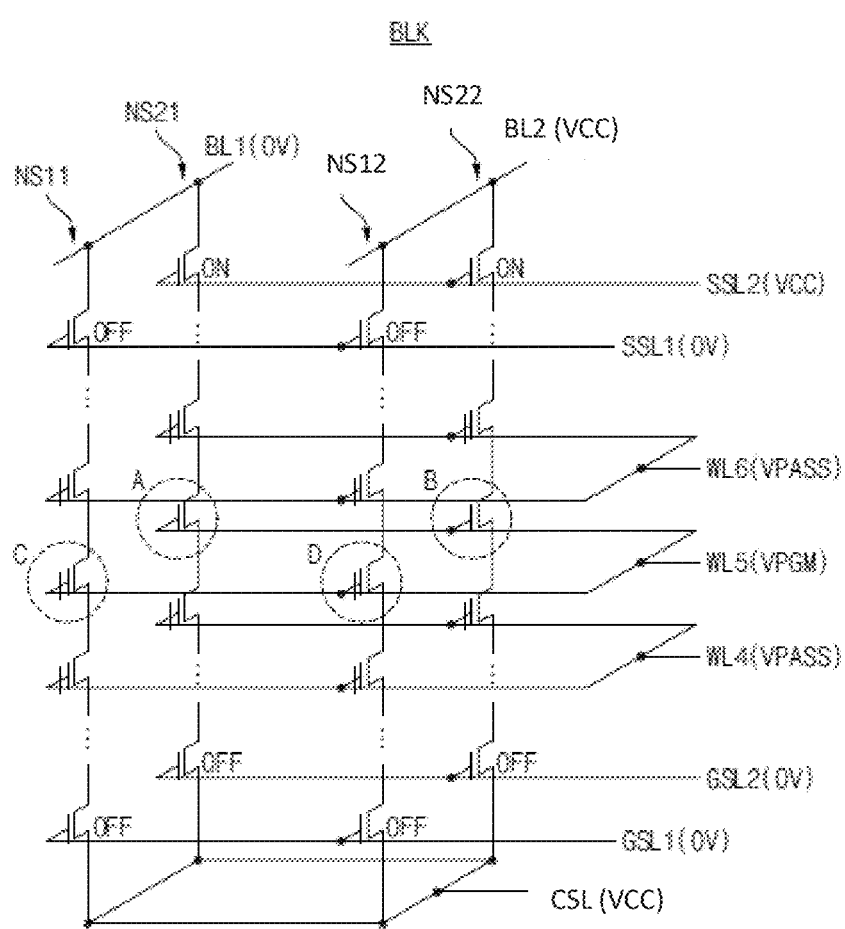
FIG. 10 is a diagram illustrating a program bias condition of a three-dimensional flash memory device.

FIG. 10 is a diagram illustrating a program bias condition of a three-dimensional flash memory device.

For convenience of description, among a plurality of NAND strings of a memory block BLK, NAND strings NS11 and NS21 connected to a first bitline BL1 and NAND strings NS12 and NS22 connected to a second bitline BL2 are illustrated in FIG. 10.

The first bitline BL1 may be a program bitline to which a program permission voltage (e.g., 0 V) is applied, and the second bitline BL2 may be a program inhibition bitline to which a program inhibition voltage such as a power supply voltage Vcc is applied. If the NAND string NS21 among the NAND strings NS11 and NS21 is selected, during a program operation, a voltage of 0 V may be applied to a first string selection line SSL1, and the power supply voltage Vcc may be applied to a second string selection line SSL2.

The voltage of 0 V may be applied to ground selection lines GSL1 and GSL2. Furthermore, a voltage (e.g., Vcc) higher than 0 V may be applied to a common source line CSL. A program voltage Vpgm (e.g., 18 V) may be applied to a selected wordline (e.g., WL5) and a pass voltage Vpass (e.g., 8 V) may be applied to unselected wordlines (e.g., WL4 and WL6).

Under the program bias condition, a voltage of 18 V may be applied to a gate of a memory cell A having a channel voltage of 0 V. Since a strong electric field is formed between the gate and a channel of the memory cell A, the memory cell A may be programmed. However, since respective channels of memory cells C and D are in a floating state, channel voltages thereof may be boosted up to, for example, about 8 V, and thus, the memory cells C and D may not be programmed. The memory cell B may not be programmed because a weak electric field is formed between the gate of the memory cell B and the channel.

Figure 11:
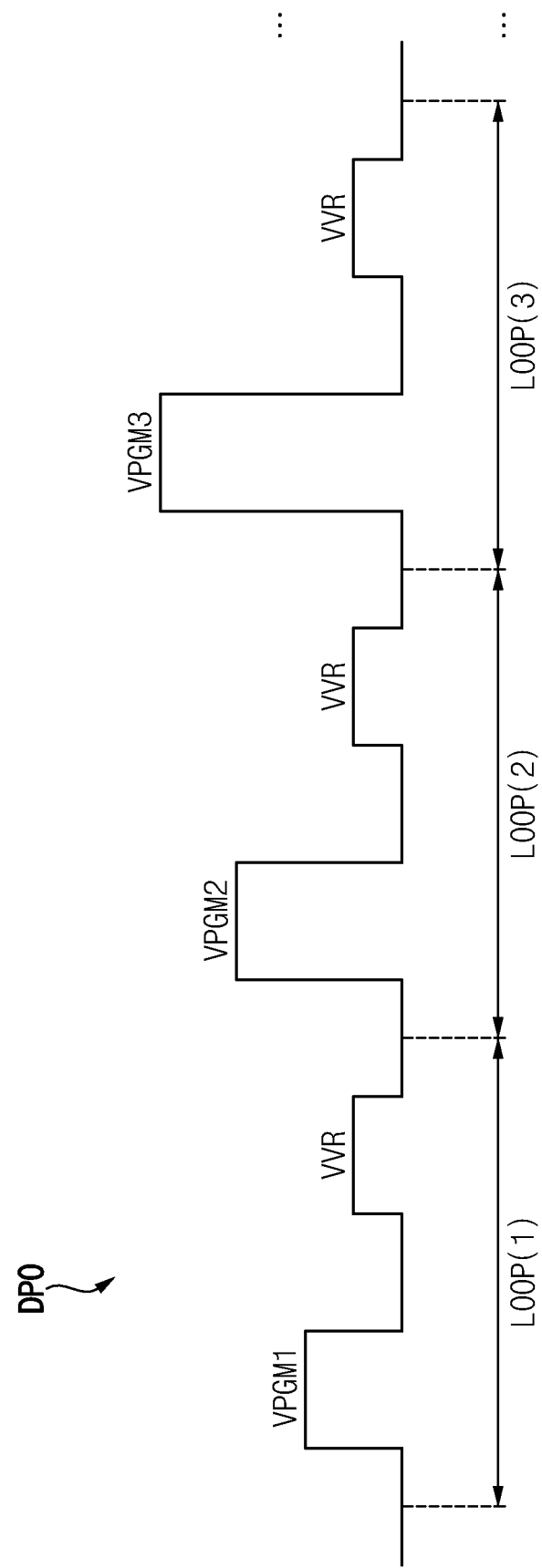
FIG. 11 is a diagram illustrating a data program operation according to an incremental step pulse programming (ISPP).
Figure 12:
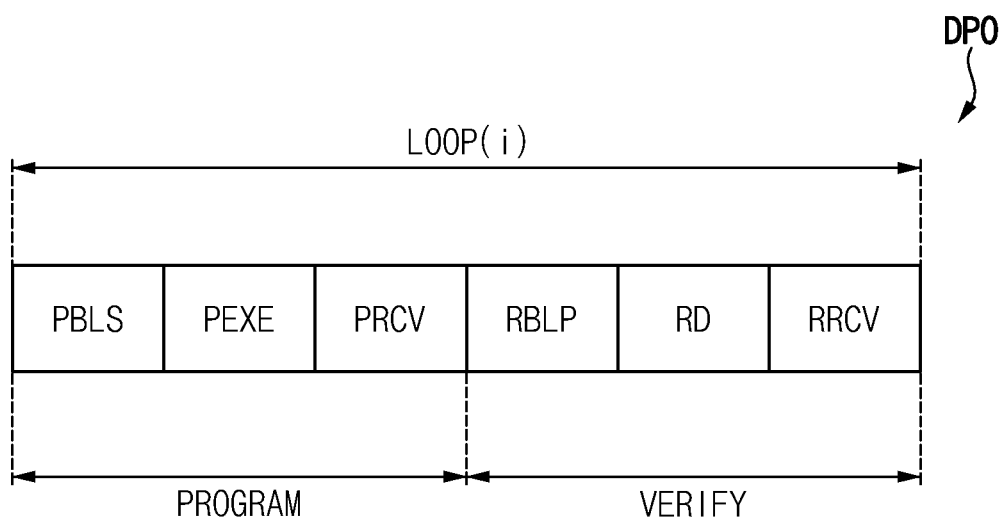
FIG. 12 is a diagram illustrating operation periods included in each program loop of FIG. 11.

FIG. 11 is a diagram illustrating a data program operation according to an incremental step pulse programming (ISPP), and FIG. 12 is a diagram illustrating operation periods included in each program loop of FIG. 11.

Referring to FIGS. 11 and 12, a plurality of program loops LOOP (1), LOOP (2) and LOOP (3) may be sequentially performed according to ISPP until the data program is completed. As the program loop is repeated, the data program voltages VPGM1, VPGM2, and VPGM3 may increase step by step.

Each program loop LOOP (i) may include a program period PROGRAM and a verification period VERIFY. During the program period PROGRAM, a data program execution operation may be performed by applying data program voltages VPGM1, VPGM2 and VPGM3 to the selected wordline to program the selected memory cells. Thereafter, a data verification operation may be performed by applying the data verification read voltage VVR to the selected wordline to verify the success of the program during the verification period VERIFY.

The data program execution operation and the data verification operation may be repeatedly performed while increasing the data program voltages VPGM1, VPGM2 and VPGM3 until a pass condition is satisfied. Here, the pass condition represents the maximum allowable number of unprogrammed memory cells of which threshold voltage is lower than the data verification read voltage VVR among selected memory cells to be programmed. The data program loops may be repeated until the number of unprogrammed memory cells becomes smaller than the maximum allowable number. The maximum allowable number may be determined according to the ECC level of the nonvolatile memory device.

The program period PROGRAM may include a bitline setup period PBLS, a program execution period PEXE, and a program recovery period PRCV. The verification period VERIFY may include a bitline precharge period RBLP, a verification read period RD, and a read recovery period RRCV. The bitline setup period PBLS, the program execution period PEXE, the program recovery period PRCV, the bitline precharge period RBLP, the verification read period RD, and the read recovery period RRCV are the same as described with reference to FIG. 9.

Figure 13:
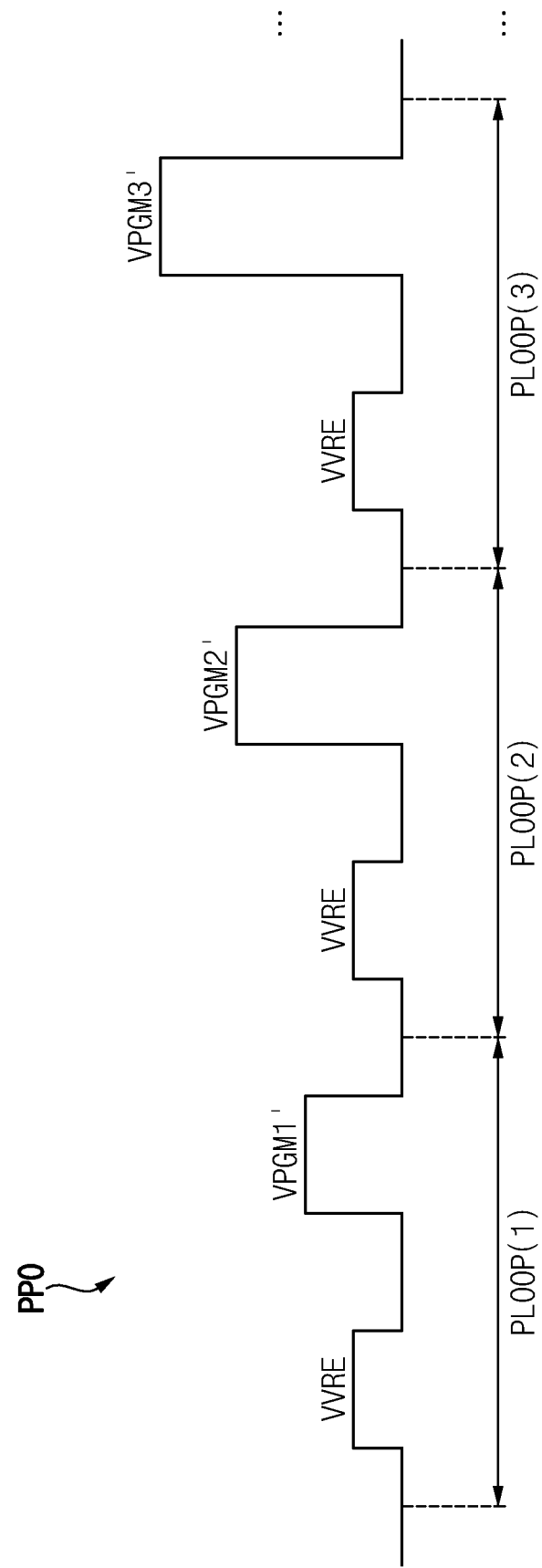
FIG. 13 is a diagram illustrating a preprogram operation by an ISPP scheme according to one or more example embodiments.
Figure 14:
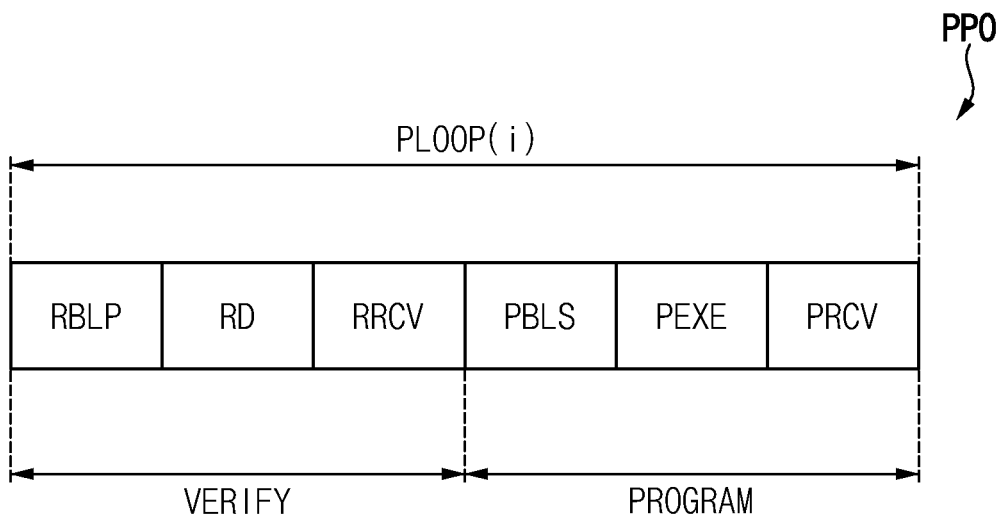
FIG. 14 is a diagram illustrating operation periods included in each program loop of FIG. 13.

FIG. 13 is a diagram illustrating a preprogram operation by an ISPP scheme according to one or more example embodiments, and FIG. 14 is a diagram illustrating operation periods included in each program loop of FIG. 13.

Referring to FIGS. 13 and 14, a plurality of preprogram loops PLOOP(1), PLOOP(2) and PLOOP(3) may be sequentially performed according to ISPP until the preprogram is completed. As the preprogram loop is repeated, the program voltages VPGM1', VPGM2' and VPGM3' may increase step by step.

Each preprogram period PLOOP (i) may include a verification period VERIFY and a program period PROGRAM. During the verification period VERIFY, a pre-verification operation may be performed by applying a pre-verification read voltage VVRE to the selected wordline to determine over-erased memory cells having threshold voltages lower than the pre-verification read voltage VVRE among the selected memory cells. Thereafter, during the program period PROGRAM, a preprogram execution operation may be performed by applying preprogram voltages VPGM1', VPGM2' and VPGM3' to the selected wordline to increase the threshold voltages of the over-erased memory cells.

The pre-verification operation and the preprogram execution operation may be repeatedly performed while stepwise increasing the preprogram voltages VPGM1' VPGM2" and VPGM3' until the pass condition is satisfied. Here, the pass condition represents the maximum allowable number of the over-erased memory cells of which threshold voltages are lower than the pre-verification read voltage VVRE among the selected memory cells, The preprogram loops may be repeatedly performed until the number of over-erased memory cells becomes smaller than the maximum allowable number.

In some example embodiments, the pass condition of the preprogram operation PPO may be more relaxed than the pass condition of the data program operation DPO. In other words, the maximum allowable number of over-erased memory cells of the preprogram operation PPO may be set greater than the maximum allowable number of unprogrammed memory cells of the data program operation DPO.

The verification period VERIFY may include a bitline precharge period RBLP, a verify read period RD, and a read recovery period RRCV. The program period PROGRAM may include a bitline setup period PBLS, a program execution period PEXE, and a program recovery period PRCV. The bitline setup period PBLS, the program execution period PEXE, program recovery period PRCV, the bitline precharge period RBLP, the verification read period RD, and the read recovery period RRCV are the same as described with reference to FIG. 9.

As described with reference to FIGS. 11 and 12, each program loop LOOP (i) of the data program operation DPO sequentially includes the program period PROGRAM and the verification period VERIFY. On the other hand, as described with reference to FIGS. 13 and 14, each preprogram loop PLOOP (i) of the preprogram operation PPO sequentially includes the verification period VERIFY and the program period PROGRAM.

Figure 15:
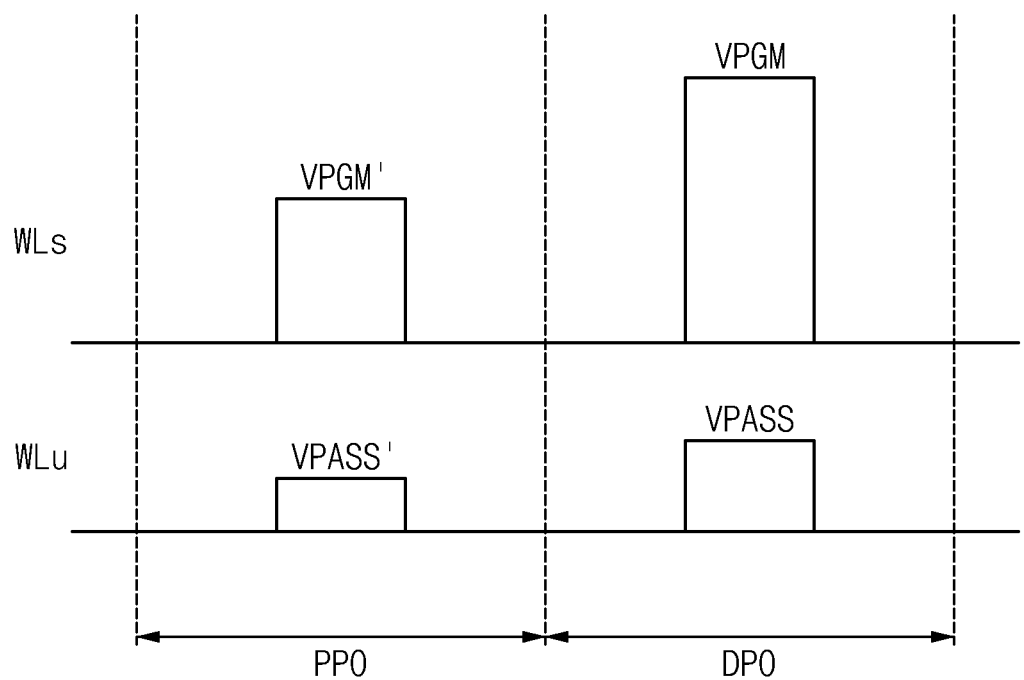
FIG. 15 is a diagram illustrating voltages in a data program operation and a preprogram operation according to one or more example embodiments.

FIG. 15 is a diagram illustrating voltages in a data program operation and a preprogram operation according to one or more example embodiments.

The threshold voltage to be programmed by the preprogram operation PPO is always lower than the threshold voltage to be programmed by the data program operation DPO. Therefore, as shown in FIG. 15, the preprogram voltage VPGM'applied to the selected wordline WLs corresponding to the write addresses during the preprogram operation PPO may be set to be lower than the data program voltage VPGM applied to the selected wordline WLs during the data program operation DPO.

In addition, the channel boosting level of unselected memory cells required during the preprogram operation PPO is lower than the channel boosting level of unselected memory cells required during the data program operation DPO. Therefore, as shown in FIG. 15, the preprogram pass voltage VPASS'applied to the unselected wordlines WLu excluding the selected wordlines WLs during the preprogram operation PPO may be set to be lower than the data program pass voltage VPASS applied to the unselected wordlines WLu during the data program operation DPO.

Meanwhile, referring to FIG. 3 again, the pre-verification read voltage VVRE of the preprogram operation PPO may be set to be lower than the data verification read voltage (e.g., the verification read voltage VVR1 corresponding to the program state S2 in FIG. 3) corresponding to the lowest program state (e.g., the program state S2 in FIG. 3) of the data program operation DPO. Also, the preprogram voltage VPGM'of the preprogram operation PPO may be set to be lower than the data program voltage corresponding to the lowest program state (e.g., S2 in FIG. 3) of the data program operation DPO.

As such, the operating conditions such as a verification read voltage, a program voltage, and a program pass voltage may be set differently for the preprogram operation PPO and the data program operation DPO. In addition to the voltages, a development time, a bitline forcing condition, etc. may be set differently for the preprogram operation PPO and data program operation DPO.

In some example embodiments, the operating conditions of the preprogram operation PPO may be varied according to an operating environment of the nonvolatile memory device. For example, as the operating temperature of the nonvolatile memory device increases, retention characteristics of the nonvolatile memory device may deteriorate. Accordingly, as the operating temperature increases, the range of the over-erased group may be set wider or the pass condition of the preprogram operation PPO may be strengthened.

In some example embodiments, the operating conditions of the preprogram operation PPO may be varied according to operating characteristics of the nonvolatile memory device. For example, retention characteristics of the non-volatile memory device may deteriorate as the P/E cycle of the nonvolatile memory device increases. Accordingly, as the P/E cycle increases, the range of the above-described over-erased group may be set wider or the pass condition of the preprogram operation PPO may be strengthened.

Figure 16:
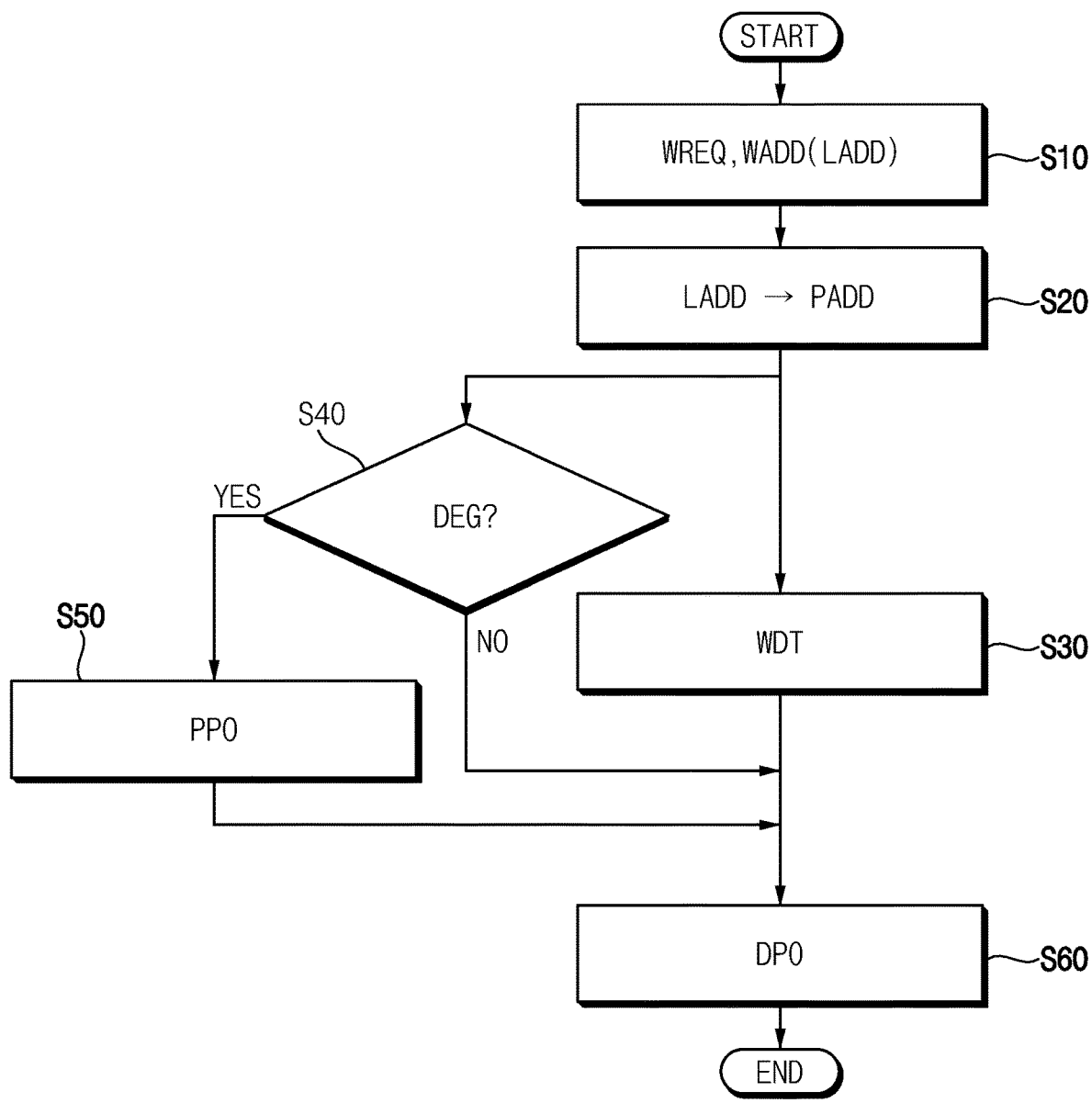
FIG. 16 is a flowchart illustrating a method of controlling a nonvolatile memory device in a method of controlling a nonvolatile memory device according to one or more example embodiments.

FIG. 16 is a flowchart illustrating a method of controlling a nonvolatile memory device in a method of controlling a nonvolatile memory device according to one or more example embodiments.

Referring to FIGS. 1 and 16, the storage device 1200 may receive a write request WREQ and a logical address LADD corresponding to the write address WADD from the host device 1100 (S10). The storage controller 100 may perform an FTL operation to convert the logical address LADD transmitted from the host device 1100 into the physical address PADD corresponding to the write address WADD (S20).

The write data WDT is transmitted from the host device 1100 to the storage device 1200 (S30), and the storage controller 100 may control the non-volatile memory device 400 perform the data program operation DPO of writing the write data into the selected memory cells (S60).

Meanwhile, when the physical address PADD corresponding to the write address WADD is determined, the preprogram controller 130 may determine, based on the physical address PADD corresponding to the write address WADD, whether the selected memory cells correspond to the over-erased group DEG S40.

When the selected memory cells correspond to the over-erased group DEG (S40: YES), the storage controller 100 may control the nonvolatile memory device 400 to perform the preprogram operation PPO (see S50) of increasing the threshold voltage of the selected memory cell in the over-erased state.

On the other hand, when the selected memory cells do not correspond to the over-erased group DEG (S40: NO), the storage controller 100 control the nonvolatile memory device 400 to skip the preprogram operation PPO and perform only the data program operation DPO.

Figure 17:
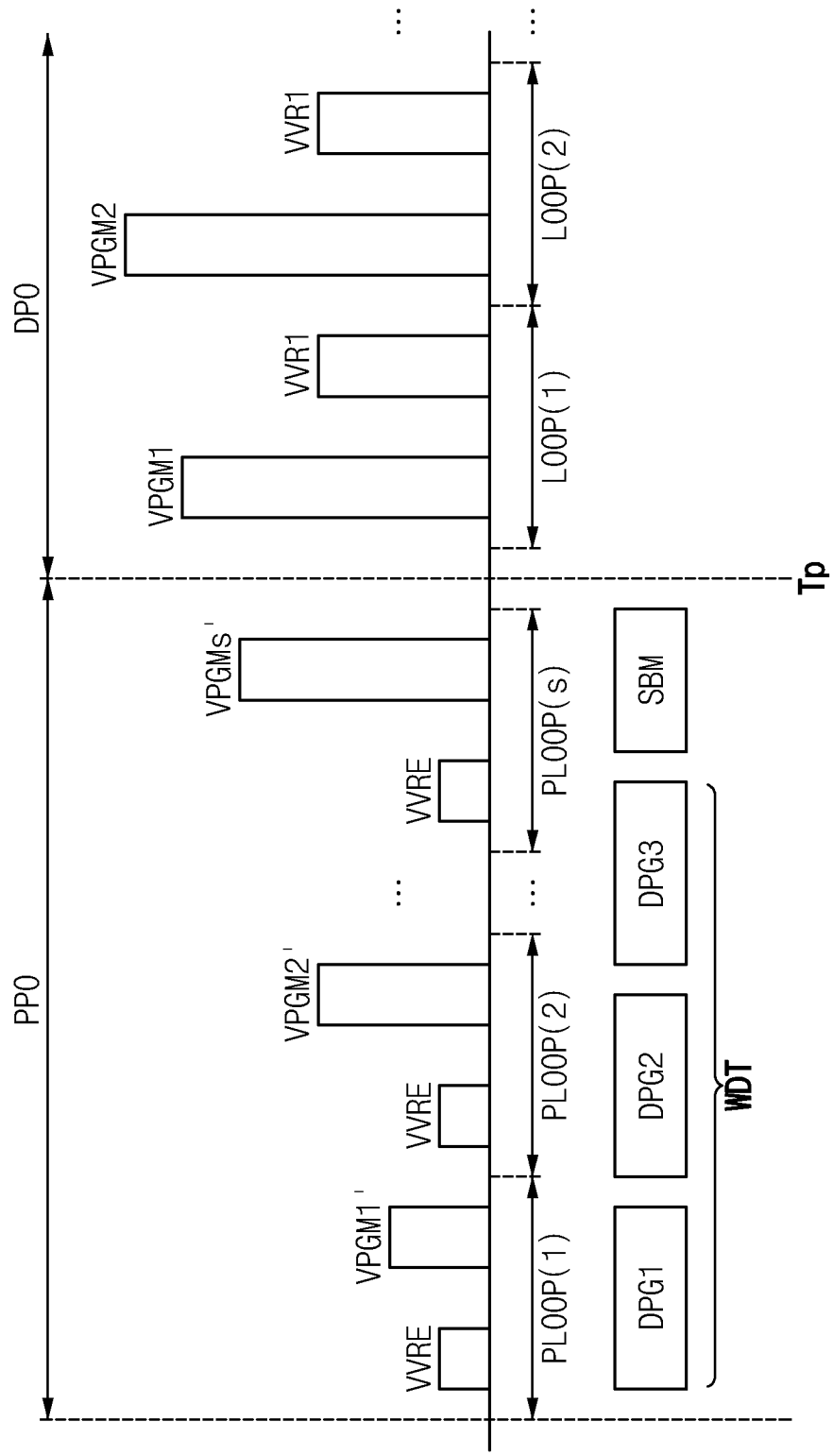
FIG. 17 is a diagram illustrating a timing of a preprogram operation in a method of controlling a nonvolatile memory device according to one or more example embodiments.

FIG. 17 is a diagram illustrating a timing of a preprogram operation in a method of controlling a nonvolatile memory device according to one or more example embodiments.

Referring to FIGS. 1 and 17, the storage device 1200 may receive the write data WDT corresponding to a plurality of page data DPG1, DPG2 and DPG3 from the host device 1100, and perform the aforementioned status-bit mapping SBM with respect to the plurality of page data DPG1, DPG2 and DPG3 as described with reference to FIG. 4. The cooked data generated by the state-bit mapping SBM may be transferred to the nonvolatile memory device 400, and the data program operation DPO may be performed based on the cooked data at a time point Tp.

As shown in FIG. 17, the preprogram operation PPO may be performed while the write data WDT are received from the host device 1100 and the state-bit mapping SBM is performed. In other words, the preprogram operation PPO may be performed in parallel with the preparation process of the data program operation DPO, such as transmission of the write data WDT and the state-bit mapping SBM.

The transmission of the write data WDT takes a relatively long time, and thus the preprogram operation PPO may be performed during the transmission of the write data WDT by properly setting the maximum number(s) of the preprogram loops PLOOP (1)~PLOOP(s). Accordingly, the time point Tp of starting the data program operation DPO may be determined uniformly regardless of whether the preprogram operation PPO is performed or omitted.

As a result, the reliability of the nonvolatile memory device may be efficiently enhanced without deteriorating the performance of the nonvolatile memory device by performing the preprogram operation while transferring the write data and performing the state-bit mapping.

Figure 18:
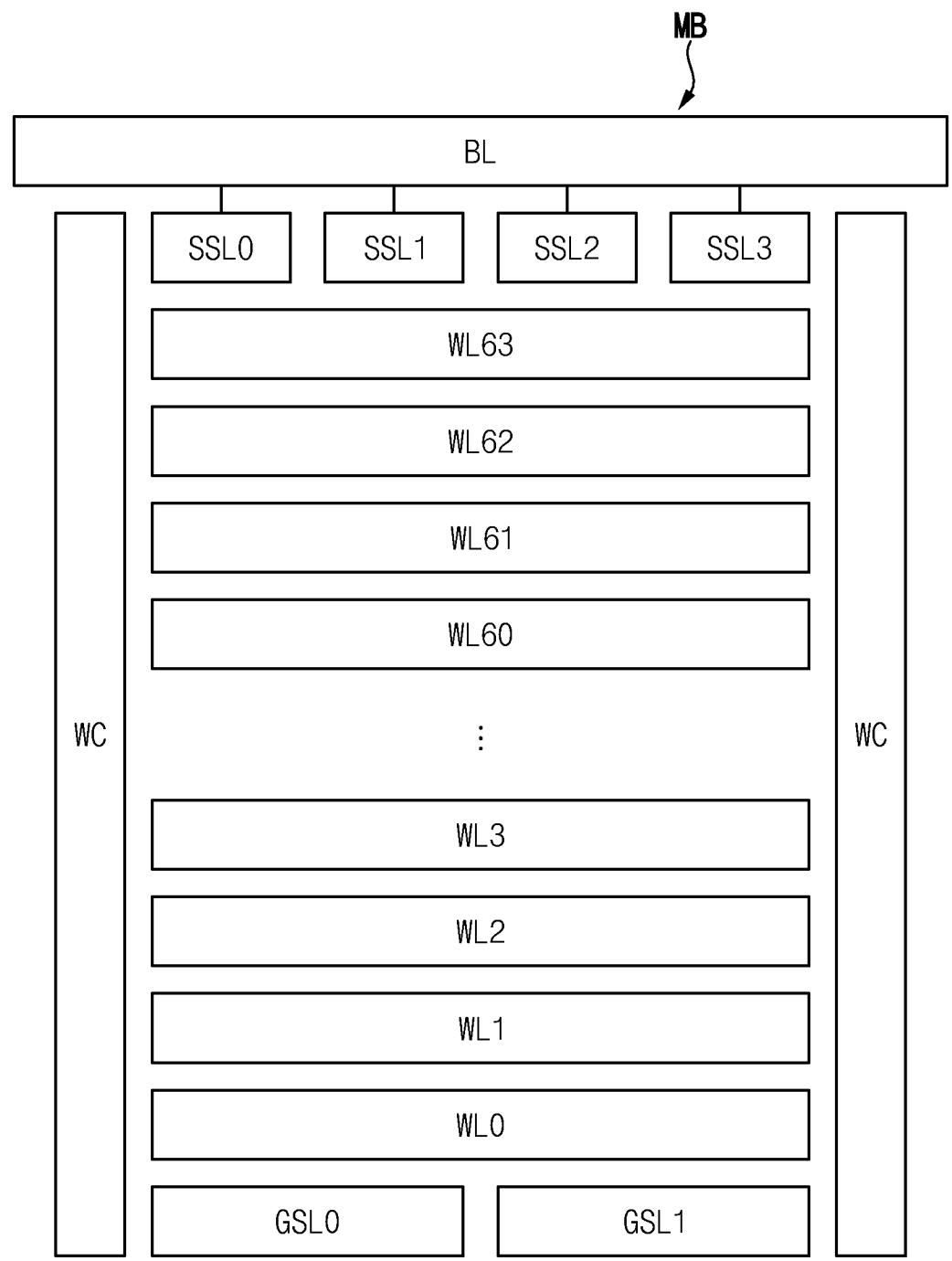
FIG. 18 is a diagram illustrating a memory block included in a three-dimensional flash memory device.

FIG. 18 is a diagram illustrating a memory block included in a three-dimensional flash memory device.

Referring to FIG. 18, a memory block MB includes ground selection lines GSL0 and GSL1, wordlines WL0~WL63, and string selection lines SSL0~SSL3 stacked in a vertical direction D3. As described with reference to FIG. 8, the memory block MB includes a plurality of cell strings (or NAND strings), and each cell string includes a plurality of memory cells arranged in the vertical direction D3. The plurality of memory cells are connected to wordlines WL0-WL63. Each memory block MB may include cell strings disposed in a second horizontal direction D2 between two adjacent wordline cut areas WC.

The plurality of string selection lines SSL0~SSL3 may be formed on the uppermost gate layer of the memory block, and a plurality of string selection transistors respectively controlling electrical connections between the plurality of cell strings and the bitline BL may be connected to the plurality of string selection lines SSL0~SSL3.

A plurality of ground selection lines GSL0 and GSL1 may be formed on the lowest gate layer of the memory block, and a plurality of ground selection transistors respectively controlling electrical connections between the plurality of cell strings and the common source line CSL may be is connected to the ground selection lines GSL0 and GSL1. FIG. 18 illustrates an example in which one ground selection line is allocated to every two cell strings, but example embodiments are not limited thereto. FIG. 18 shows the memory block MB including 4 string selection lines SSL0~SSL3 and 64 wordlines WL0~WL63 for convenience of illustration, but the number of string selection lines and the number of wordlines included in each memory block may be determined variously.

As described above with reference to FIG. 6, during the program operation, the address decoder 830 may select one of a plurality of string selection lines SSL as a selected string selection line based on the row address R_ADDR provided from the control circuit 850.

Figures 19, 20A:
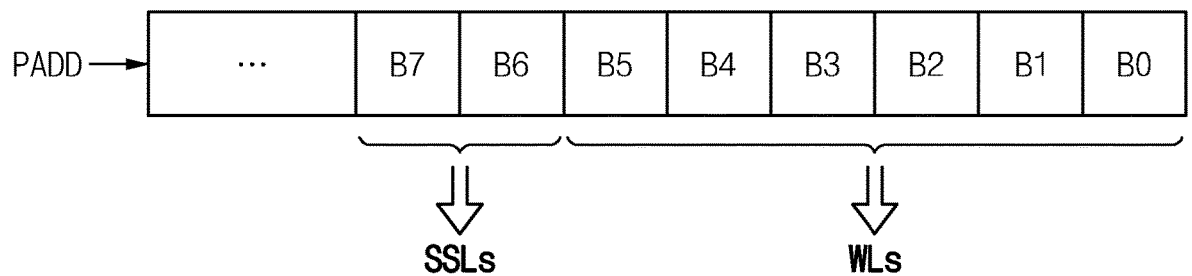

FIGS. 19, 20A and 20B are diagrams illustrating bits of a physical address of a nonvolatile memory device according to example embodiments. FIGS. 19, 20A and 20B show exemplary bits of the physical address PADD corresponding to the memory block MB of FIG. 18.

Referring to FIG. 19, the physical address PADD (including bits B7, B6, B5, B4, B3, B2, B1 and B0) of the nonvolatile memory device may include first address bits B0~B5 indicating a selected wordline WLs and second address bits B6 and B7 indicating a selected string selection line SSLs.

As shown in FIG. 20A, different values of the second address bits B6 and B7 may one-to-one correspond to the string selection lines SSL0~SSL3 of the memory block MB. Accordingly, the physical position of the selected string selection line SSLs in the memory block MB may be determined by values of the second address bits B6 and B7. For example, when the values of the second address bits B6 and B7 of the physical address PADD are "11" or "00", the selected string selection lines SSLs may correspond to the outermost string selection lines that are closest to the wordline cut area WC.

As shown in FIG. 20B, different values of the first address bits B0~B5 may one-to-one correspond to the wordlines WL0~WL63 of the memory block MB. Accordingly, the physical position of the selected wordline WLs within the memory block MB may be determined by values of the first address bits B0~B5. For example, when the value of the first address bits B0~B5 of the physical address PADD is "111111", the selected wordline WLs may correspond to the uppermost wordline WL63, and when the value of the first address bits B0~B5 of the physical address PADD is "000000", the selected wordline WLs corresponds to the lowermost wordline WL0. As will be described below with reference to FIGS. 24 through 28, the over-erased group may be set based on the physical locations of memory cells.

Figure 21:
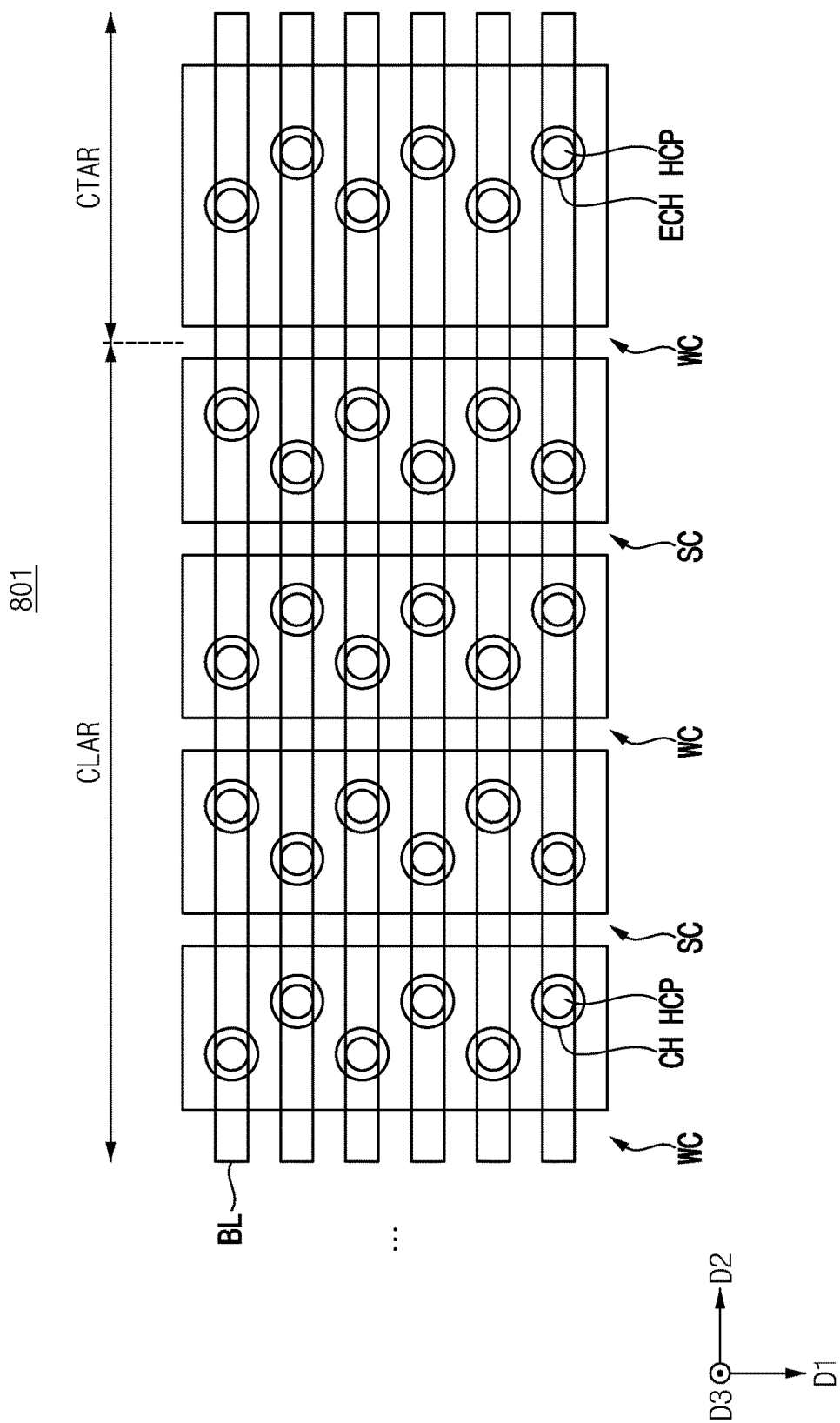
FIG. 21 is a plan view of a nonvolatile memory device according to one or more example embodiments.
Figure 22:
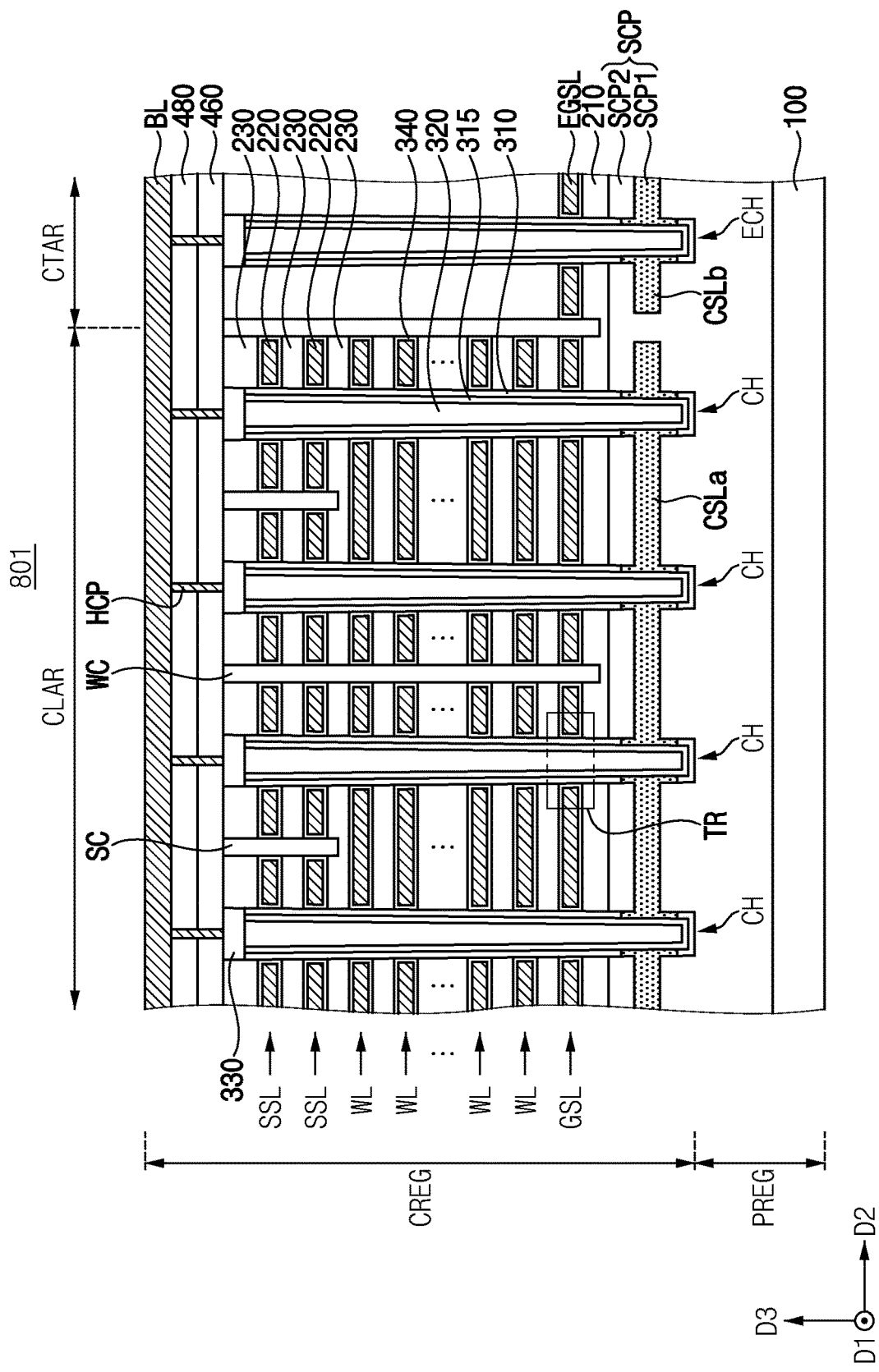
FIG. 22 is a cross-sectional diagram illustrating an example vertical structure of the nonvolatile memory device of FIG. 21.
Figure 23:
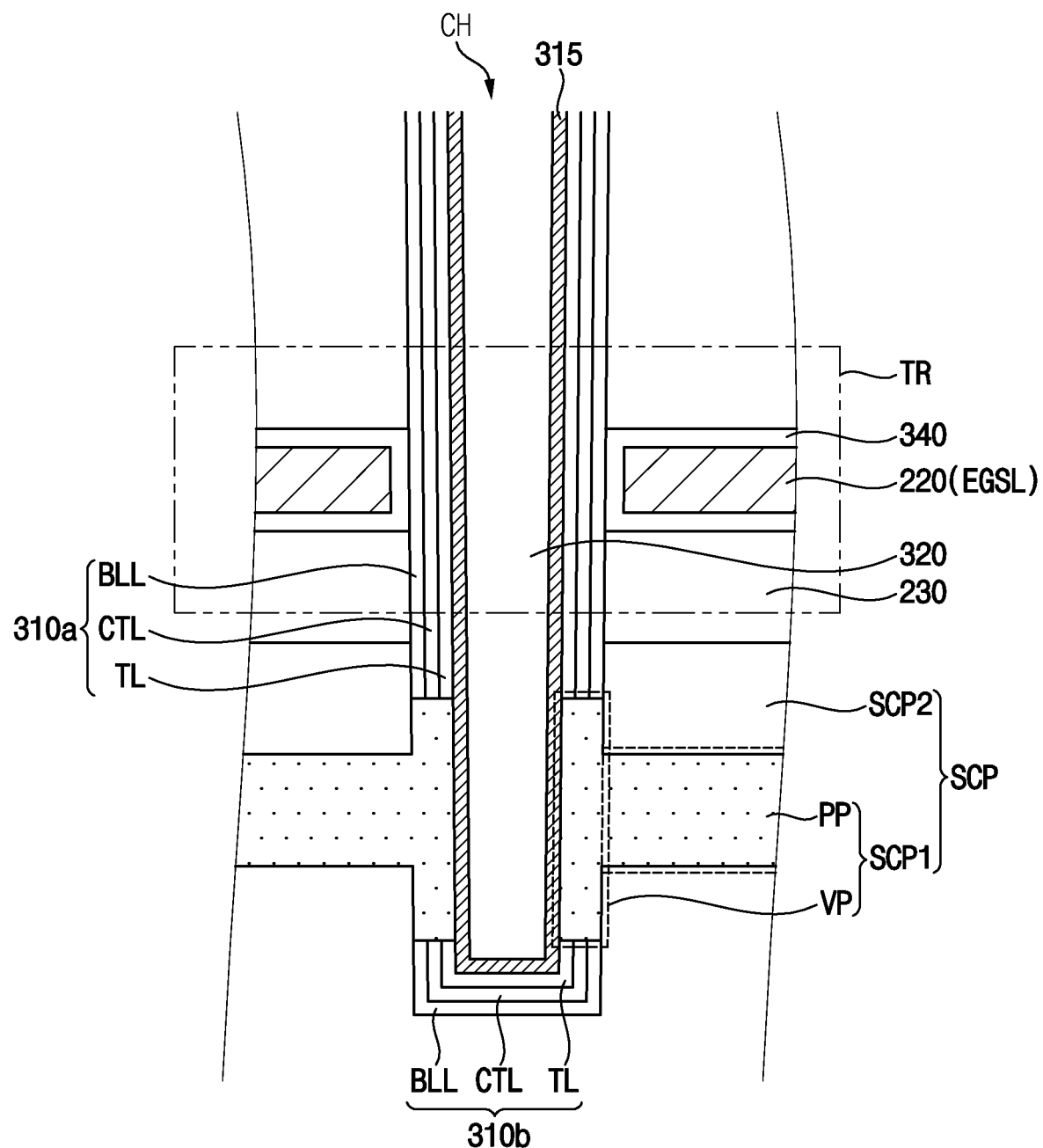
FIG. 23 is an enlarged sectional view of an end portion of a channel structure included in the nonvolatile memory device of FIG. 21.

FIG. 21 is a plan view of a nonvolatile memory device according to one or more example embodiments, FIG. 22 is a cross-sectional diagram illustrating an example vertical structure of the nonvolatile memory device of FIG. 21, and FIG. 23 is an enlarged sectional view of an end portion of a channel structure included in the nonvolatile memory device of FIG. 21.

FIG. 22 illustrates a vertical structure by cutting a nonvolatile memory device 801 of FIG. 21 along the second horizontal direction D2. Hereinafter, descriptions repeated with FIG. 1 may be omitted.

Referring to FIGS. 21, 22 and 23, a gate electrode structure including gate lines or gate electrodes SSL, WL and GSL may be disposed above a semiconductor substrate 100. The substrate 100 may include a semiconductor material, e.g., silicon, germanium, silicon-germanium, or III-V semiconductor compounds, e.g., GaP, GaAs, GaSb, etc. The gate electrode structure SSL, WL and GSL may be cut by the string selection line cut areas SC and/or the wordline cut areas WC as described above.

The gate electrode structure SSL, WL and GSL may include a buffer oxide layer 210, and gate electrodes 220 and insulating patterns 230, which are alternately and repeatedly stacked on the buffer oxide layer 210. The buffer oxide layer 210 may cover a top surface of the substrate 100. The buffer oxide layer 210 may include, for example, a thermally-grown oxide layer or a silicon oxide layer. The gate electrodes 220 may include at least one ground selection gate electrode GSL, cell gate electrodes WL, and at least one string selection gate electrode SSL. The ground selection gate electrode GSL may be the lowermost electrode of the gate electrodes 220, and the string selection gate electrode SSL may be the uppermost electrode of the gate electrodes 220. The cell gate electrodes WL may be disposed between the ground selection gate electrode GSL and the string selection gate electrode SSL. The gate electrodes 220 may be formed of or may include at least one of, for example, doped silicon, metals (e.g., tungsten), metal nitrides, metal silicides, or any combination thereof.

The insulating patterns 230 may be disposed between the gate electrodes 220, which are placed adjacent to each other in the vertical direction D3 perpendicular to the top surface of the substrate 100. The majority of the insulating patterns 230 may have the same thickness, and at least one of the insulating patterns 230 may be thicker than other insulating patterns. For example, an uppermost insulating pattern (hereinafter, a first insulating pattern) on the string selection gate electrode SSL may be thicker than underlying insulating patterns. The first insulating pattern may be thicker by at least two times than the underlying insulating patterns. The insulating patterns 230 may be formed of or may include, for example, silicon oxide.

The nonvolatile memory device 801 may be divided in the vertical direction D3 into the cell region CREG and the peripheral region PREG and may be divided in the second horizontal direction D2 into the cell string area CLAR and the contact area CTAR.

The cell channel structures CH may penetrate the gate electrode structure SSL, WL and GSL. Each cell channel structure CH may include a vertical channel portion 315 and a charge storing structure 310 surrounding the vertical channel portion 315. In addition, each cell channel structure CH may include an internal space, which is formed in the vertical channel portion 315, and a gap-fill layer 320, which is surrounded by the internal space. Each cell channel structure CH may include a pad 330 provided in an upper portion thereof. The cell channel structures CH may be arranged in a zigzag shape or in a line shape, when viewed top down. The vertical channel portions 315 may be electrically connected to the substrate 100. The vertical channel portions 315 may include a single layer or multiple layers. The vertical channel portions 315 may include at least one of, for example, a single crystalline silicon layer, an organic semiconductor layer, or carbon nanostructures.

The charge storing structures 310 may extend along outer sidewalls of the vertical channel portions 315 and in the vertical direction D3. For example, the charge storing structures 310 may have a shape surrounding the outer sidewalls of the vertical channel portions 315. The charge storing structures 310 may include at least one of, for example, a silicon oxide layer, a silicon nitride layer, a silicon oxynitride layer, and high-k dielectric layers and may have a single- or multi-layered structure.

As shown in FIG. 23, each of the charge storing structures 310 may include a tunnel insulating layer TL, a blocking insulating layer BLL, and a charge storing layer CTL. The tunnel insulating layer TL may be disposed adjacent to each of the vertical channel portions 315 to enclose or cover the outer sidewall of the vertical channel portion 315. The blocking insulating layer BLL may be disposed adjacent to the gate electrodes 220. The charge storing layer CTL may be disposed between the tunnel insulating layer TL and the blocking insulating layer BLL. The tunnel insulating layer TL may include, for example, a silicon oxide layer or a high-k dielectric layer (e.g., aluminum oxide (Al2O3) or hafnium oxide (HfO2)). The blocking insulating layer BLL may include, for example, a silicon oxide layer or a high-k dielectric layer (e.g., aluminum oxide (Al2O3) or hafnium oxide (HfO2)). The charge storing layer CTL may include, for example, a silicon nitride layer. The gap-fill layers 320 may include, for example, a silicon oxide layer, a silicon nitride layer, or a silicon oxynitride layer.

The pad 330 may be disposed in the upper portion of each cell channel structure CH and each erase channel structure ECH. The pad 330 may extend laterally to cover the top surface of the vertical channel portion 315 and a top surface of the charge storing structure 310. The pad 330 may cover at least one of a top surface of the tunnel insulating layer TL, a top surface of the charge storing layer CTL, and a top surface of the blocking insulating layer BLL. For example, as shown in FIG. 22, the pad 330 may cover all of the top surfaces of the tunnel insulating layer TL, the charge storing layer CTL, and the blocking insulating layer BLL. The pad 330 may include a semiconductor material that is doped with impurities of the first conductivity type. As an example, the pad 330 may be a highly doped n-type region.

The vertical channel portion 315 and the pad 330 may be formed of a semiconductor material (e.g., silicon). As an example, the vertical channel portion 315 and the pad 330 may include poly silicon. The vertical channel portion 315 and the pad 330 may have different crystallographic structures from each other.

During the erase operation, the erase voltage Vers may be applied to the bitlines BL, and, through the GIDL phenomenon, electron-hole pairs may be produced in the vertical channel portion 315. The electrons may be moved toward the pads 330 and the holes may be supplied to the vertical channel portions 315. Thus, it may be possible to effectively provide the holes into the charge storing layers CTL from the vertical channel portions 315, during the erase operation, and consequently to improve an erase operation property of the three-dimensional nonvolatile memory device.

A first interlayered insulating layer 460 may be disposed on the gate electrode structure SSL, WL and GSL. The first interlayered insulating layer 460 may cover the top surface of the uppermost insulating pattern 230 and the top surfaces of the pads 330. The first interlayered insulating layer 460 may include, for example, a silicon oxide layer.

A second interlayered insulating layer 480 may be disposed on the first interlayered insulating layer 460. The second interlayered insulating layer 480 may cover a top surface of the first interlayered insulating layer 460. The second interlayered insulating layer 480 may include, for example, a silicon oxide layer. The channel contact plugs HCP may be disposed on each cell channel structure CH and each erase channel structure ECH. The channel contact plugs HCP may penetrate the second and first interlayered insulating layers 460 and 480 and may be in direct contact with the pads 330. The channel contact plugs HCP may include at least one of, for example, metal materials (e.g., copper or tungsten) and metal nitrides (e.g., TiN, TaN, or WIN).

The bitlines BL may be disposed on the second interlayered insulating layer 480. The bitlines BL may extend in second horizontal direction D2 in the cell string area CLAR and the contact area CTAR. The bitlines BL may be arranged to be spaced apart from each other in the first horizontal direction D1. Each bitline BL may be electrically connected to the cell channel structures CH and the erase channel structure ECH arranged along the second horizontal direction D2. The bitlines BL may include, for example, a metal material.

The charge storing structure 310 may be provided to enclose the side surface of the vertical channel portion 315 and may be interposed between the bottom surface of the vertical channel portion 315 and the substrate 100. In other words, the vertical channel portion 315 may be separated from the substrate 100.

A source conductive pattern SCP may be disposed between the substrate 100 and the buffer oxide layer 210. The source conductive pattern SCP may include a first source conductive pattern SCP1 and a second source conductive pattern SCP2. The second source conductive pattern SCP2 may be disposed on a top surface of the first source conductive pattern SCP1. The first source conductive pattern SCP1 may be extended from a region between the substrate 100 and the second source conductive pattern SCP2 to other regions between the second source conductive pattern SCP2 and the vertical channel portion 315 and between the substrate 100 and the vertical channel portion 315. As illustrated in FIG. 23, due to the first source conductive pattern SCP1, the charge storing structure 310 may be divided into an upper charge storing structure 310a, which is placed on the first source conductive pattern SCP1, and a lower charge storing structure 310b, which is placed below the first source conductive pattern SCP1.

In some example embodiments, the first source conductive pattern SCP1 may include a horizontal portion PP and a vertical portion VP. The horizontal portion PP of the first source conductive pattern SCP1 may be disposed between the substrate 100 and the second source conductive pattern SCP2. The vertical portion VP may be extended from a region between the vertical channel portion 315 and the horizontal portion PP to other regions between the second source conductive pattern SCP2 and the vertical channel portion 315 and between the substrate 100 and the vertical channel portion 315. The vertical portion VP may be in contact with the charge storing structure 310. A top surface of the vertical portion VP may be located at a vertical level between a top surface of the horizontal portion PP and a top surface of the second source conductive pattern SCP2. A bottom surface of the vertical portion VP may be located at a lower vertical level than the top surface of the substrate 100. The first and second source conductive patterns SCP1 and SCP2 may be formed of a polysilicon layer, which is doped with impurities of the first conductivity type, and a concentration of impurities doped into the second source conductive pattern SCP2 may be higher than that in the first source conductive pattern SCP1. Such source conductive pattern SCP may be used as the above-described source line CSL.

The erase channel structures ECH may be formed in the contact area CTAR that is adjacent to the cell string area CLAR in the second horizontal direction D2. The erase channel structures ECH are connected between the bitlines BL and the source line CSL. The erase channel structures ECH include the erase transistors ETR, respectively. The erase selection line EGSL is formed in the contact area CTAR to form the gate electrodes of the erase transistors ETR in the erase channel structures ECH.

In some example embodiments, as shown in FIG. 22, the source line CSL is cut at the boundary between the cell string region CLAR and the contact region CTAR, into a first source line segment CSLa and a second source line segment CSLb.

The first source line segment CSLa may be connected to the cell channel structures CH, and the second source line segment CSLb may be connected to the erase channel structures ECH. As a result, during an erase operation, the erase voltage applied to the first source line segment CSLa and the erase voltage applied to the second source line segment CSLb may be independently controlled.

Figure 24:
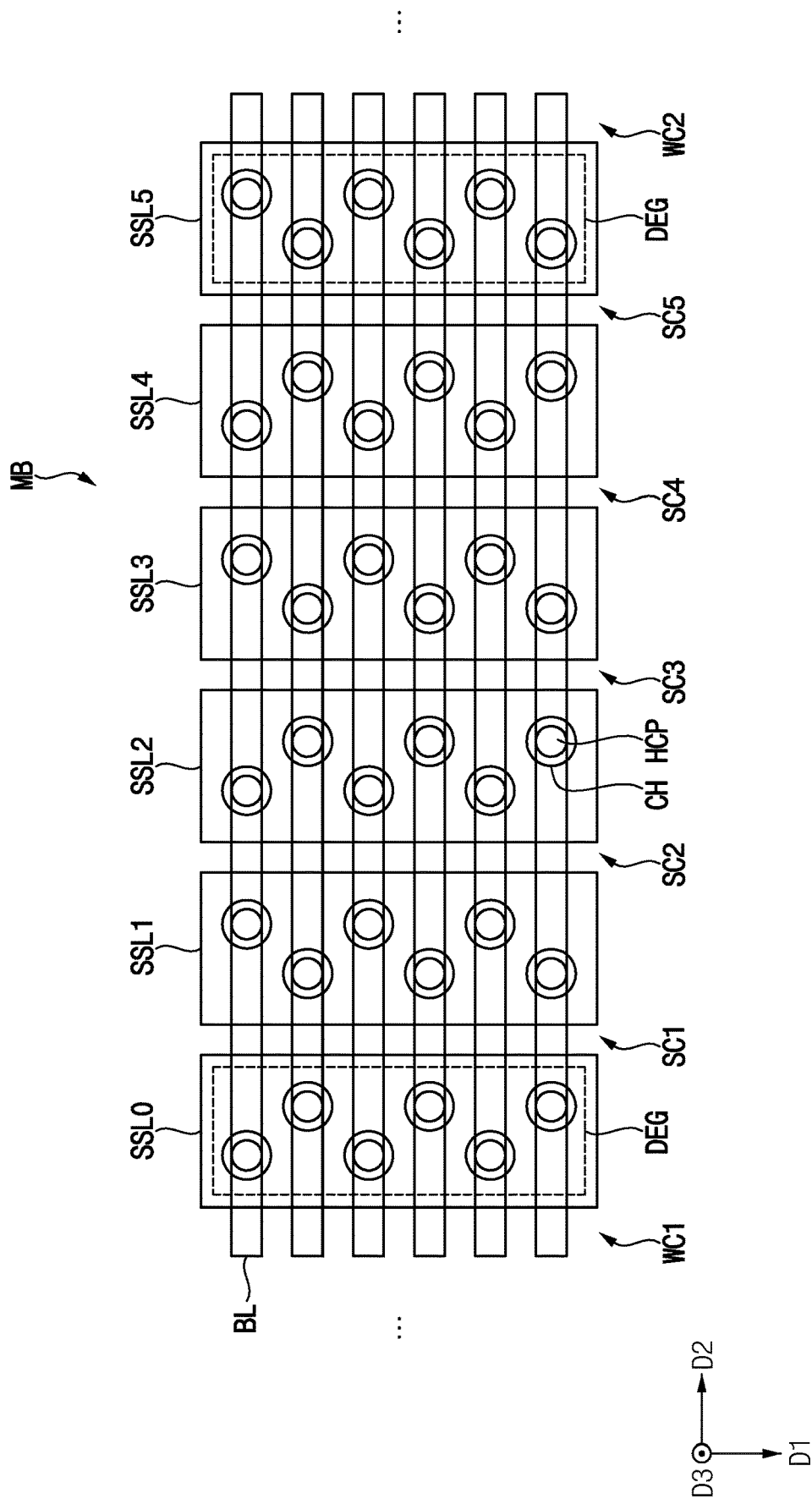
FIGS. 24, 25 and 26 are diagrams illustrating setting over-erased groups in a method of controlling a nonvolatile memory device according to example embodiments.

As shown in FIG. 22, the ground selection transistors respectively formed in the cell channel structures CH and the erase transistors respectively formed in the erase channel structures ECH may be formed at the same height in the vertical direction D3. In this case, the erase selection line EGSL may be implanted as a portion of the ground selection line GSL by cutting the ground selection line extending in the second horizontal direction D2 across the cell string area CLAR and the contact area CTAR. For example, the ground selection line GSL may be cut by the wordline cut area WC at the boundary between the cell string region CLAR and the contact region CTAR, and the portion of the ground selection line GSL included in the contact region CTAR may be provided as the erase selection line EGSL. In other words, a wordline cut is a boundary between wordlines and occurs after a number of columns in a D2 direction. The wordline cut is a separation and the wordline cut occupies a plane made by the D1 and D3 axes. In the non-limiting example of FIG. 24 given below, a wordline cut, WC, is defined in a D1/D3 plane and occurs every six columns of NAND strings as one moves in the D2 direction.

As the generation of NAND flash memory devices increases, the number of vertically stacked wordlines and the number of string selection lines disposed between adjacent wordline cut areas are increasing. As the number of stacked wordlines increases, memory capacity relative to the same area may be increased. Also, as the number of wordline cut areas is reduced, that is, as the number of string selection lines disposed between adjacent wordline cut areas is increased, that is, as the number of the word line cut areas is decreased, the memory density may be increased.

However, as the number of string selection lines disposed between adjacent wordline cut areas increases, a channel hole skew between an area near and far from the wordline cut area increases, and accordingly, an erase speed skew and a program speed skew increase. Because the thickness of the charge storage structure 310 becomes thinner in the area adjacent to the wordline cut area due to limitations in the manufacturing process, the erase speed increases. Accordingly, the number of over-erased memory cells may increase in an area closer to the wordline cut area.

Accordingly, as will be described below with reference to FIGS. 24, 25 and 26, an over-erased group may be set based on the distance between the channel holes and the wordline cut area. In other words, whether the selected memory cells belong to the over-erased group may be determined based on the distance between the channel holes including the selected memory cells and the wordline cut area.

Figure 25:
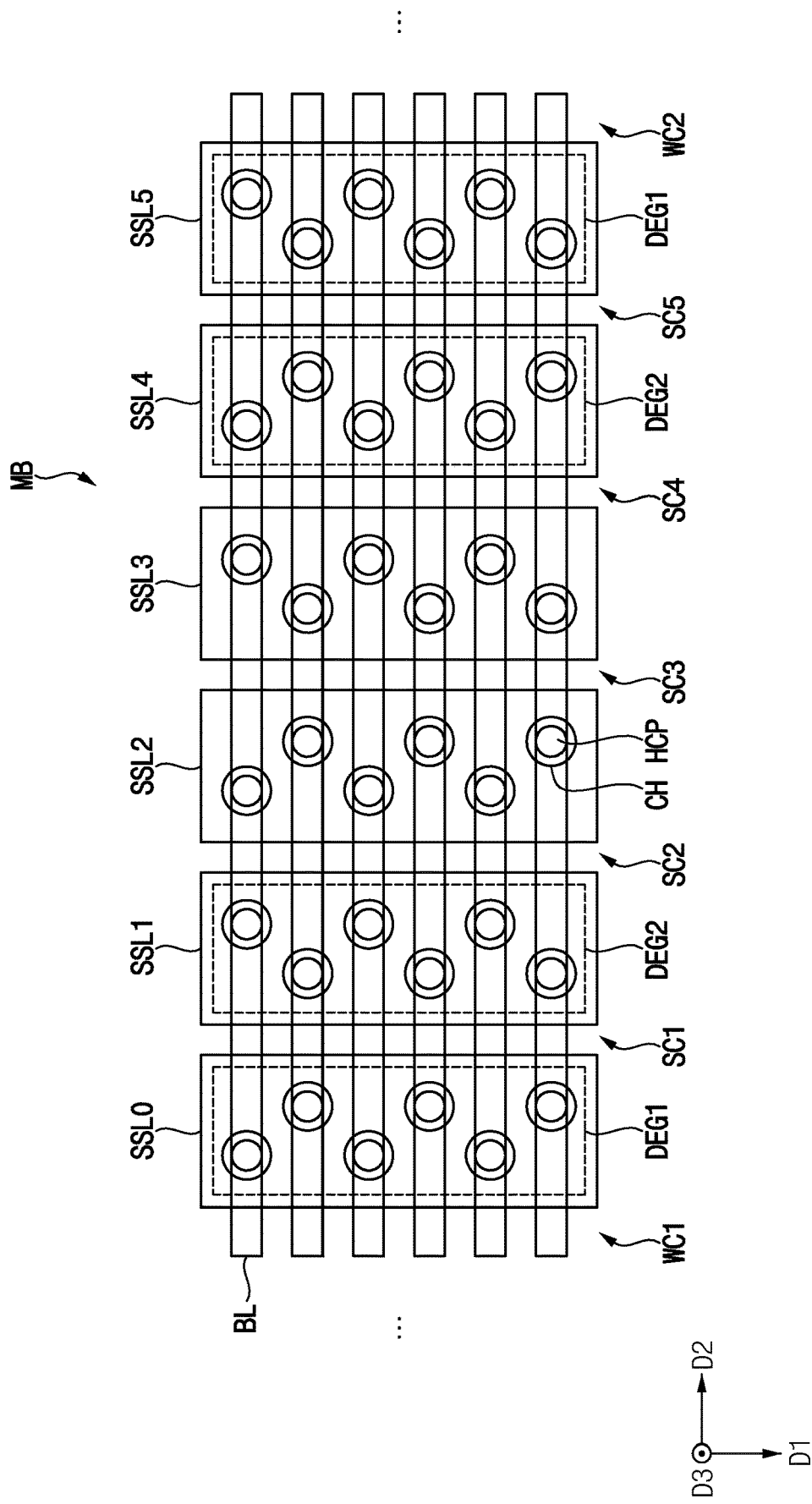
Figure 26:
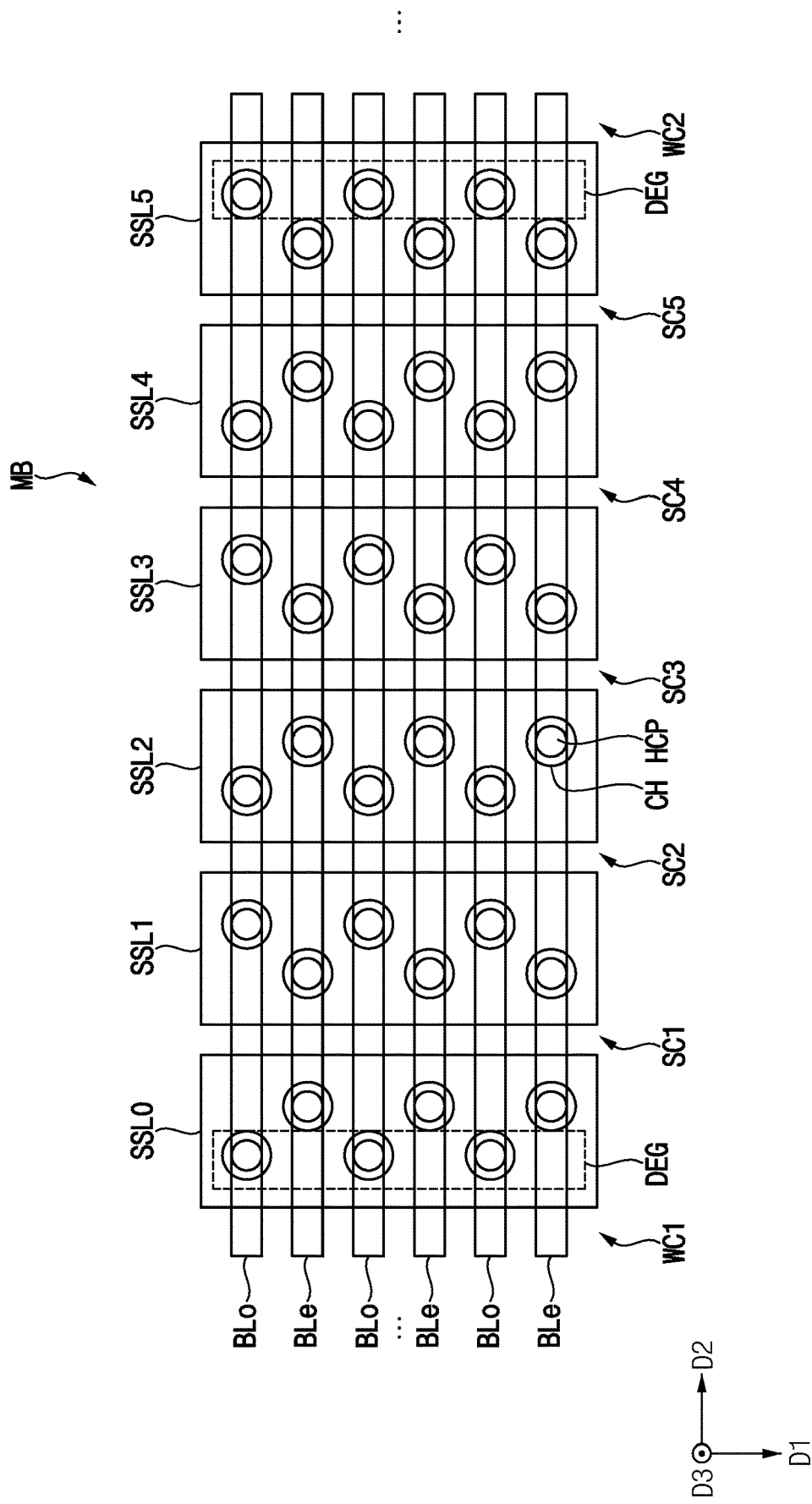

FIGS. 24, 25 and 26 are diagrams illustrating setting over-erased groups in a method of controlling a nonvolatile memory device according to one or more example embodiments. Hereinafter, descriptions overlapping those of FIGS. 21, 22 and 23 are omitted.

Referring to FIGS. 24, 25 and 26, a plurality of string selection lines, for example, first through sixth string selection lines SSL0~SSL5 may be disposed between a first wordline cut area WC1 and a second wordline cut area WC2 that are adjacent in the second horizontal direction D2. The first through sixth string selection lines SSL0~SSL5 may be formed by cutting a gate line having the same height by the string line cut areas SC1~SC5. FIGS. 24, 25 and 26 show an example in which the six string selection lines SSL0~SSL5 are disposed between the two wordline cut areas WC1 and WC2 for convenience of illustration and description, but example embodiments are not limited thereto. The number of string selection lines included in one memory block may be variously determined.

In some example embodiments, the memory cells connected to an outermost string selection line most adjacent to a wordline cut area may be set as an over-erased group. For example, as shown in FIG. 24, the memory cells connected to the first string selection line SSL0 closest to the first wordline cut area WC1 and the sixth string selection line SSL5 closest to the second wordline cut area WC2 may be set as an over-erased group DEG.

In this case, the preprogram controller 130 of FIG. 1 may determine that the selected memory cells are included in the over-erased group DEG, when the selected string selection line SSLs corresponds to the outermost string selection lines SSL0 and SSL5 most adjacent to the wordline cut areas WC1 and WC2. On the other hand, the preprogram controller 130 may determine that the selected memory cells are not included in the over-erased group DEG, when the selected string selection line SSLs do not correspond to the outermost string selection lines SSL0 and SSL5.

In some example embodiments, the over-erased group may be subdivided according to the distance between the string selection line and the wordline cut area. For example, as shown in FIG. 25, the outermost string selection lines SSL0 and SSL5 closest to the wordline cut areas WC1 and WC2 may be set as a first de-erase group DEG1, and the string selection lines SSL1 and SSL4 may be set as a second over-erased group DEG2.

The memory cells of the first over-erased group DEG1 have a higher program speed than the memory cells of the second over-erased group DEG2. Accordingly, the preprogram voltage of the first over-erased group DEG1 may be set lower than the preprogram voltage of the second over-erased group DEG2. In other words, in the nonvolatile memory device, as the distance between the select string selection lines SSLs corresponding to the selected memory cells and the wordline cut area WC decreases, the preprogram voltage applied to the selected wordline WLs during the preprogram operation PPO may be reduced.

In some example embodiments, as shown in FIG. 26, only the memory cells included in the outermost channel holes closest to the wordline cut areas WC1 and WC2 may be set as the de-erase group DEG. For example, among channel holes connected to the outermost string selection lines SSL0 and SSL5, the outermost channel holes are connected to a bitline BLo, and other channel holes are connected to another bitline BLe. In this case, the above-described preprogram operation PPO may be performed only on the memory cells connected to the bitline BLo among memory cells connected to the outermost string selection lines SSL0 and SSL5, and the preprogram operation PPO may be blocked with respect to the memory cells connected to the bitline BLe. The preprogram operation PPO may be blocked by applying the program inhibit voltage VINH described with reference to FIG. 9 to the bitline BLe regardless of the result of the above-described pre-verification operation.

As such, the preprogram controller 130 of FIG. 1 may determine that the selected memory cells correspond to the over-erased group when the channel holes including the selected memory cells correspond to the outermost channel holes closest to the wordline cut area. On the other hand, the preprogram controller 130 may determine that the selected memory cells do not correspond to the over-erased group when the channel holes including the selected memory cells do not correspond to the outermost channel holes.

Figure 27:
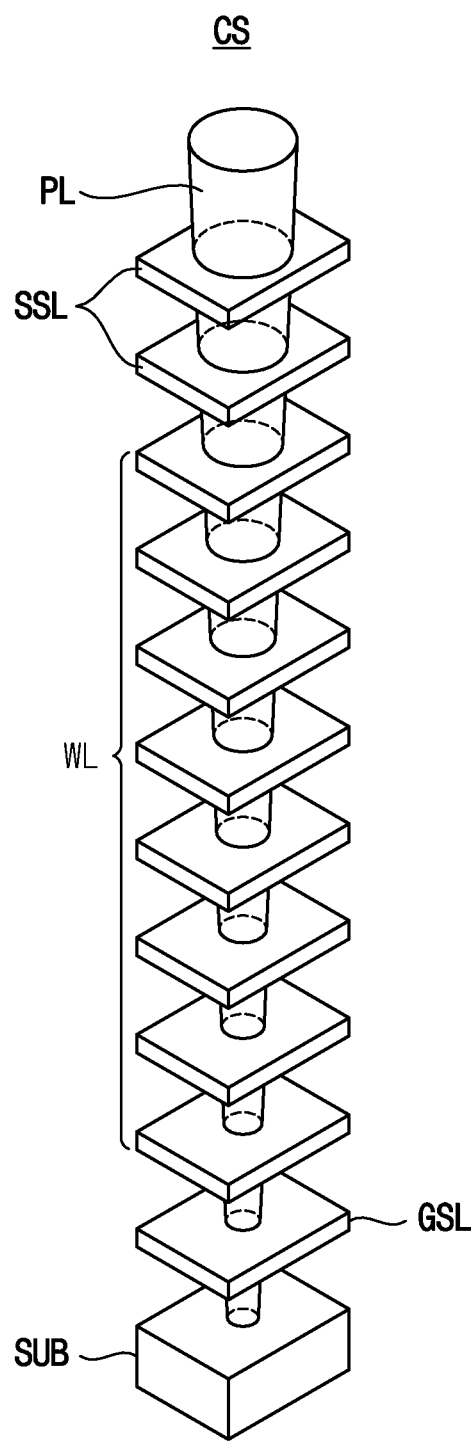
FIG. 27 is a diagram illustrating an example structure of a cell string.

FIG. 27 is a diagram illustrating an example structure of a cell string.

Referring to FIG. 27, to form a cell string CS, a pillar PL extending in a direction perpendicular to the surface of substrate SUB and contacting the substrate SUB may be provided on the substrate SUB. The ground selection line GSL, wordlines WL, and string selection lines SSL may be formed of conductive materials parallel to the substrate SUB, for example, metal materials. The pillar PL may contact the substrate SUB by passing through conductive materials forming the ground selection line GSL, the wordlines WL, and the string selection lines SSL. Also, the wordlines WL may include dummy wordlines not used for data storage. A dummy wordline may be used for a variety of purposes.

For example, in the manufacturing process of the cell string CS, the width of the pillar PL or the cross-sectional area parallel to the upper surface of the substrate SUB may be formed smaller as the distance to the substrate SUB decreases. Therefore, when the same voltage is applied to the bodies of the ground selection transistor GST, the memory cells MCs, and the string select transistors SSTs, the electric field formed in the memory cell adjacent to the substrate SUB or the ground selection transistor GST may be greater than the electric field formed in the memory cell or string select transistor SST far from the substrate SUB. These characteristics affect program disturbances that occur while the program operations are being performed. However, the width of the pillar PL or the cross-sectional area parallel to the upper surface of the substrate SUB is not limited thereto. The width of the pillar PL or the cross-sectional area parallel to the upper surface of the substrate SUB may be formed differently according to the distance from the substrate SUB depending on the etching process.

Figure 28:
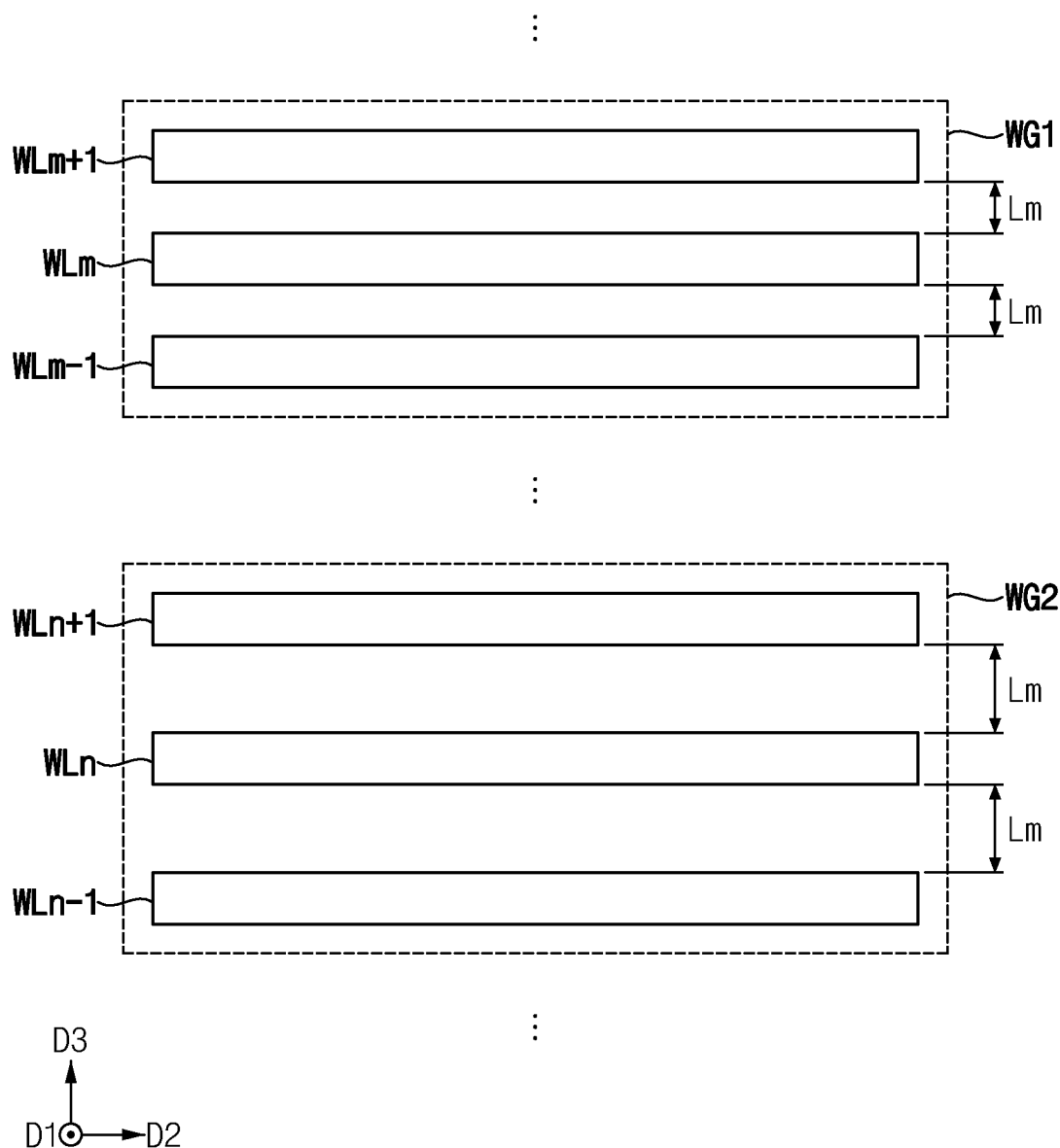
FIG. 28 is a diagram illustrating an over-erased group in a method of controlling a nonvolatile memory device according to one or more example embodiments.

FIG. 28 is a diagram illustrating an example embodiment of an over-erased group in a method of controlling a nonvolatile memory device according to one or more example embodiments.

In a nonvolatile memory device, intervals between adjacent wordlines may be differently set according to heights in the vertical direction D3 according to limitations of a manufacturing process, relationships with peripheral components, and the like. As the wordline spacing decreases, disturbance between adjacent memory cells may increase and retention characteristics may deteriorate. Accordingly, as the wordline spacing decreases, it is further required to reduce the number of the memory cells in the over-erased state.

In some example embodiments, the over-erased group may be set based on wordline interval. For example, wordlines may be grouped according to wordline interval and memory cells belonging to a group having a small wordline interval may be set as an over-erased group.

Referring to FIG. 28, the interval Lm of the wordlines WLm+1, WLm and WLm−1 belonging to the first group WG1 is relatively small, and the interval Lm of the wordlines WLn+1, WLn and WLn−1 belonging to the second group WG2 is relatively large. In this case, the retention characteristic of the first group WG1 is deteriorated more than that of the second group WG2, and the need for the aforementioned preprogram operation PPO increases as wordline interval decreases. Accordingly, the memory cells connected to the wordlines WLm+1, WLm, and WLm−1 of the first group WG1 may be set as the over-erased group.

As such, the preprogram controller 130 of FIG. 1 may determine whether the selected memory cells are included in the over-erased group, based on the interval between the selected wordline corresponding to the write address and the neighboring wordline adjacent to the selected wordline. The preprogram controller 130 may determine that the selected memory cells correspond to the over-erased group when the interval between the selected wordline and the neighboring wordline adjacent to the selected wordline is smaller than a reference interval. On the other hand, the preprogram controller 130 may determine that the selected memory cells do not correspond to the over-erased group when the interval between the selected wordline and the adjacent wordline is greater than the reference interval.

Figure 29:
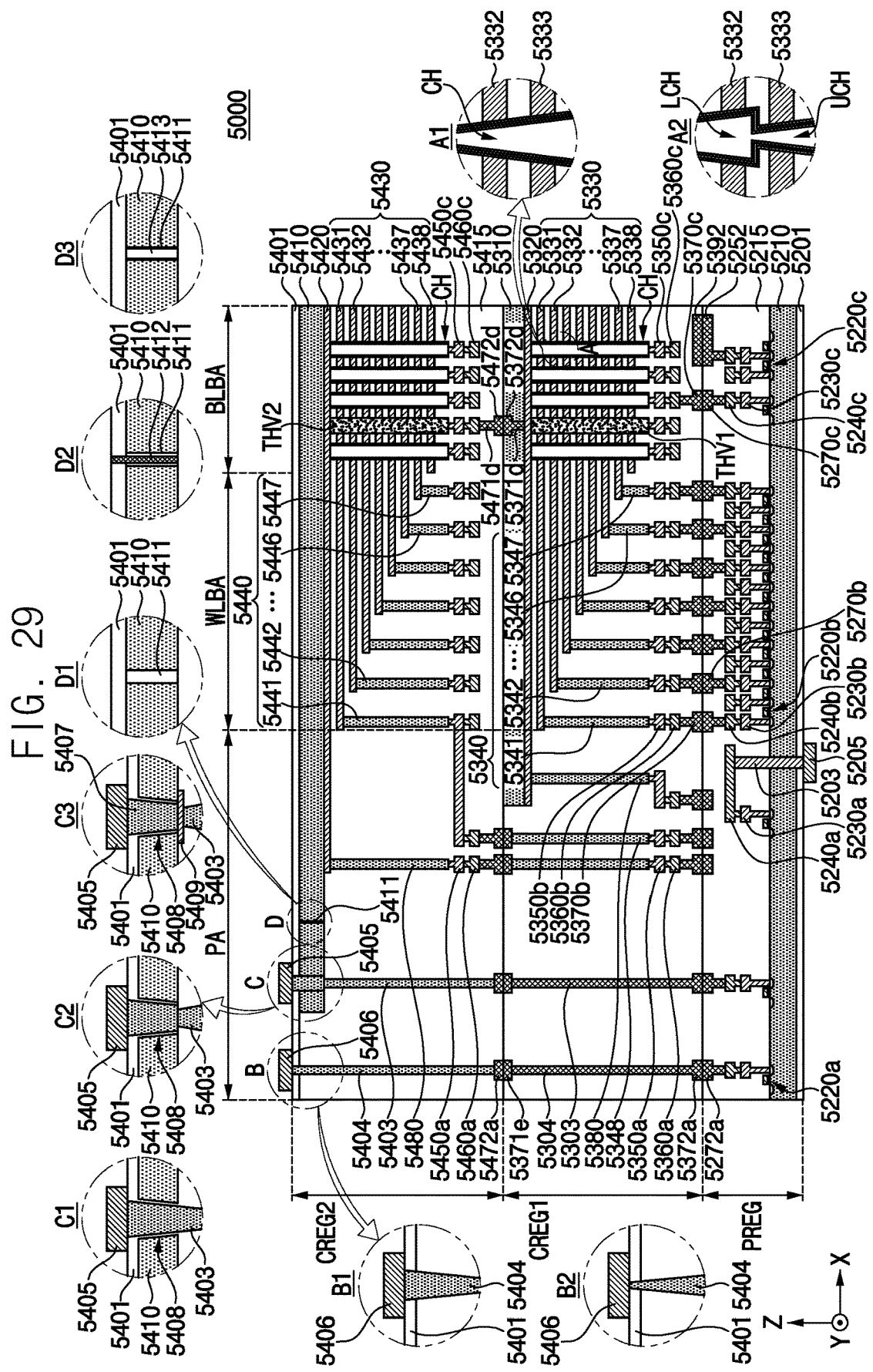
FIG. 29 is a cross-section diagram illustrating a memory device according to one or more example embodiments.

FIG. 29 is a cross-section diagram illustrating a memory device according to one or more example embodiments.

Referring to FIG. 29, a memory device 5000 may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may refer to a method of electrically and/or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively or additionally, the bonding metal patterns may be formed of other metals including, but not being limited to, aluminum (Al) or tungsten (W).

The memory device 5000 may include the at least one upper chip including the cell region. For example, as illustrated in FIG. 29, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately. Subsequently, the first upper chip, the second upper chip and the lower chip may be connected to each other by the bonding method to manufacture the memory device 5000, for example. In some embodiments, the first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a -Z-axis direction in FIG. 29. However, the present disclosure is not limited in this regard. For example, in some embodiments, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a wordline bonding region WLBA, and a bitline bonding region BLBA.

The peripheral circuit region PREG may include a first substrate 5210 and a plurality of circuit elements 5220a, 5220b and 5220c formed on the first substrate 5210. An interlayer insulating layer 5215 including one or more insulating layers may be provided on the plurality of circuit elements 5220a, 5220b and 5220c, and a plurality of metal lines electrically connected to the plurality of circuit elements 5220a, 5220b and 5220c may be provided in the interlayer insulating layer 5215. For example, the plurality of metal lines may include first metal lines 5230a, 5230b and 5230c connected to the plurality of circuit elements 5220a, 5220b and 5220c, and second metal lines 5240a, 5240b and 5240c formed on the first metal lines 5230a, 5230b and 5230c. The plurality of metal lines may be formed of at least one of various conductive materials. In some embodiments, the first metal lines 5230a, 5230b and 5230c may be formed of tungsten having a relatively high electrical resistivity, and the second metal lines 5240*a*, 5240*b* and 5240*c* may be formed of copper having a relatively low electrical resistivity.

The first metal lines 5230*a*, 5230*b* and 5230*c* and the second metal lines 5240*a*, 5240*b* and 5240*c* are illustrated and described in the present embodiments. However, the present disclosure is not limited in this regard. For example, in some embodiments, at least one or more additional metal lines may further be formed on the second metal lines 5240*a*, 5240*b* and 5240*c*. In this case, the second metal lines 5240*a*, 5240*b* and 5240*c* may be formed of aluminum, and at least some of the additional metal lines formed on the second metal lines 5240*a*, 5240*b* and 5240*c* may be formed of copper having an electrical resistivity lower than that of aluminum of the second metal lines 5240*a*, 5240*b* and 5240*c*.

The interlayer insulating layer 5215 may be disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of wordlines 5330 (e.g., 5331 to 5338) may be stacked on the second substrate 5310 in a direction (e.g., the Z-axis direction) perpendicular to a top surface of the second substrate 5310. String selection lines and a ground selection line may be disposed on and under the wordlines 5330, and the plurality of wordlines 5330 may be disposed between the string selection lines and the ground selection line. Alternatively or additionally, the second cell region CREG2 may include a third substrate 5410 and a common source line 5420, and a plurality of wordlines 5430 (e.g., 5431 to 5438) may be stacked on the third substrate 5410 in a direction (e.g., the Z-axis direction) perpendicular to a top surface of the third substrate 5410. Each of the second substrate 5310 and the third substrate 5410 may be formed of at least one of various materials, such as, but not limited to, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some embodiments, as illustrated in a region 'A1', the channel structure CH may be provided in the bitline bonding region BLBA and may extend in the direction perpendicular to the top surface of the second substrate 5310 to penetrate the wordlines 5330, the string selection lines, and the ground selection line. The channel structure CH may include a data storage layer, a channel layer, and a filling insulation layer. The channel layer may be electrically connected to a first metal line 5350*c* and a second metal line 5360*c* in the bitline bonding region BLBA. For example, the second metal line 5360*c* may be a bitline and may be connected to the channel structure CH through the first metal line 5350*c*. The bitline 5360*c* may extend in a first direction (e.g., a Y-axis direction) parallel to the top surface of the second substrate 5310.

In some embodiments, as illustrated in a region 'A2', the channel structure CH may include a lower channel LCH and an upper channel UCH, which may be connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower wordlines 5331 and 5332. The lower channel LCH may include a data storage layer, a channel layer, and a filling insulation layer and may be connected to the upper channel UCH. The upper channel UCH may penetrate upper wordlines 5333 to 5338. The upper channel UCH may include a data storage layer, a channel layer, and a filling insulation layer, and the channel layer of the upper channel UCH may be electrically connected to the first metal line 5350*c* and the second metal line 5360*c*. As a length of a channel increases, due to characteristics of manufacturing processes, it may be difficult to form a channel having a substantially uniform width. The memory device 5000, according to the present disclosure, may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a wordline located near to a boundary between the lower channel LCH and the upper channel UCH may be a dummy wordline. For example, the wordlines 5332 and 5333 adjacent to the boundary between the lower channel LCH and the upper channel UCH may be the dummy wordlines. In this case, data may not be stored in memory cells connected to the dummy wordline. Alternatively or additionally, the number of pages corresponding to the memory cells connected to the dummy wordline may be less than the number of pages corresponding to the memory cells connected to a general wordline. A level of a voltage applied to the dummy wordline may be different from a level of a voltage applied to the general wordline, and thus, it may be possible to reduce an influence of a non-uniform channel width between the lower and upper channels LCH and UCH on an operation of the memory device.

In some embodiments, the number of the lower wordlines 5331 and 5332 penetrated by the lower channel LCH may be less than the number of the upper wordlines 5333 to 5338 penetrated by the upper channel UCH in the region 'A2'. However, the present disclosure is not limited in this regard. For example, in some embodiments, the number of the lower wordlines penetrated by the lower channel LCH may be equal to or more than the number of the upper wordlines penetrated by the upper channel UCH. Alternatively or additionally, structural features and connection relation of the channel structure CH disposed in the second cell region CREG2 may be substantially the same as those of the channel structure CH disposed in the first cell region CREG1.

In the bitline bonding region BLBA, a first through-electrode THV1 may be provided in the first cell region CREG1, and a second through-electrode THV2 may be provided in the second cell region CREG2. As illustrated in FIG. 29, the first through-electrode THV1 may penetrate the common source line 5320 and the plurality of wordlines 5330. In some embodiments, the first through-electrode THV1 may further penetrate the second substrate 5310. The first through-electrode THV1 may include a conductive material. Alternatively or additionally, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 5372*d* and a second through-metal pattern 5472*d*. The first through-metal pattern 5372*d* may be formed at a bottom end of the first upper chip including the first cell region CREG1, and the second through-metal pattern 5472*d* may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In some embodiments, in the bitline bonding region BLBA, an upper metal pattern 5252 may be formed in an uppermost metal layer of the peripheral circuit region PREG, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bitline bonding region BLBA, the bitline 5360c may be electrically connected to a page buffer included in the peripheral circuit region PREG. For example, some of the circuit elements 5220c of the peripheral circuit region PREG may constitute the page buffer, and the bitline 5360c may be electrically connected to the circuit elements 5220c constituting the page buffer through an upper bonding metal pattern 5370c of the first cell region CREG1 and an upper bonding metal pattern 5270c of the peripheral circuit region PREG.

Continuing to refer to FIG. 29, in the wordline bonding region WLBA, the wordlines 5330 of the first cell region CREG1 may extend in a second direction (e.g., an X-axis direction) parallel to the top surface of the second substrate 5310 and may be connected to a plurality of cell contact plugs 5340 (e.g., 5341 to 5347). First metal lines 5350b and second metal lines 5360b may be sequentially connected onto the cell contact plugs 5340 connected to the wordlines 5330. In the wordline bonding region WLBA, the cell contact plugs 5340 may be connected to the peripheral circuit region PREG through upper bonding metal patterns 5370b of the first cell region CREG1 and upper bonding metal patterns 5270b of the peripheral circuit region PREG.

The cell contact plugs 5340 may be electrically connected to a row decoder included in the peripheral circuit region PREG. For example, some of the circuit elements 5220b of the peripheral circuit region PREG may constitute the row decoder, and the cell contact plugs 5340 may be electrically connected to the circuit elements 5220b constituting the row decoder through the upper bonding metal patterns 5370b of the first cell region CREG1 and the upper bonding metal patterns 5270b of the peripheral circuit region PREG. In some embodiments, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

In some embodiments, in the wordline bonding region WLBA, the wordlines 5430 of the second cell region CREG2 may extend in the second direction (e.g., the X-axis direction) parallel to the top surface of the third substrate 5410 and may be connected to a plurality of cell contact plugs 5440 (e.g., 5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the wordline bonding region WLBA, the upper bonding metal patterns 5370b may be formed in the first cell region CREG1, and the upper bonding metal patterns 5270b may be formed in the peripheral circuit region PREG. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of at least one metal including, but not limited to, aluminum, copper, and tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. In some embodiments, an upper metal pattern 5372a may be formed in an upper portion of the first cell region CREG1, and an upper metal pattern 5272a may be formed in an upper portion of the peripheral circuit region PREG. The upper metal pattern 5372a of the first cell region CREG1 and the upper metal pattern 5272a of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405 and 5406 may be disposed in the external pad bonding region PA. As shown in FIG. 29, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220a disposed in the peripheral circuit region PREG through a first input/output contact plug 5203 and may be separated from the first substrate 5210 by the lower insulating layer 5201. Alternatively or additionally, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220a disposed in the peripheral circuit region PREG through second input/output contact plugs 5403 and 5303, and the third input/output pad 5406 may be connected to at least one of the plurality of circuit elements 5220*a* disposed in the peripheral circuit region PREG through third input/output contact plugs 5404 and 5304.

In some embodiments, the third substrate 5410 may not be disposed in a region in which the input/output contact plug is disposed. For example, as illustrated in a region 'B', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some embodiments, as illustrated in a region 'B1', the third input/output contact plug 5404 may extend in a third direction (e.g., the Z-axis direction), and a diameter of the third input/output contact plug 5404 may become progressively greater (e.g., wider) toward the upper insulating layer 5401. In other words, a diameter of the channel structure CH described in the region 'A1' may become progressively less (e.g., narrower) toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some embodiments, as illustrated in a region 'B2', the third input/output contact plug 5404 may extend in the third direction (e.g., the Z-axis direction), and a diameter of the third input/output contact plug 5404 may become progressively less (e.g., narrower) toward the upper insulating layer 5401. In other words, like the channel structure CH, the diameter of the third input/output contact plug 5404 may become progressively less (e.g., narrower) toward the upper insulating layer 5401. For example, the third input/output contact plug 5404 may be formed together with the cell contact plugs 5440 before the second cell region CREG2 and the first cell region CREG1 are bonded to each other.

In some embodiments, the input/output contact plug may overlap with the third substrate 5410. For example, as illustrated in a region 'C', the second input/output contact plug 5403 may penetrate the interlayer insulating layer 5415 of the second cell region CREG2 in the third direction (e.g., the Z-axis direction) and may be electrically connected to the second input/output pad 5405 through the third substrate 5410. In this case, a connection structure of the second input/output contact plug 5403 and the second input/output pad 5405 may be realized by various methods.

In some embodiments, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater (e.g., wider) toward the second input/output pad 5405. However, the present disclosure is not limited in this regard. For example, in some embodiments, the diameter of the second input/output contact plug 5403 may become progressively less (e.g., narrower) toward the second input/output pad 5405.

In some embodiments, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater (e.g., wider) toward the second input/output pad 5405, and a diameter of the second input/output contact plug 5403 may become progressively less (e.g., narrower) toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some embodiments illustrated in a region 'C3', a stopper 5409 may further be formed on a bottom end of the opening 5408 of the third substrate 5410, as compared with the embodiments of the region 'C2'. The stopper 5409 may be a metal line formed in the same layer as the common source line 5420. Alternatively or additionally, the stopper 5409 may be a metal line formed in the same layer as at least one of the wordlines 5430. The second input/output contact plug 5403 may be electrically connected to the second input/output pad 5405 through the contact 5407 and the stopper 5409.

Similar to the second and third input/output contact plugs 5403 and 5404 of the second cell region CREG2, a diameter of each of the second and third input/output contact plugs 5303 and 5304 of the first cell region CREG1 may become progressively less (e.g., narrower) toward the lower metal pattern 5371*e* and/or may become progressively greater (e.g., wider) toward the lower metal pattern 5371*e*.

In some embodiments, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view. Alternatively or additionally, the second input/output pad 5405 may be located between the slit 5411 and the cell contact plugs 5440 when viewed in a plan view.

In some embodiments, as illustrated in a region 'D1', the slit 5411 may be formed to penetrate the third substrate 5410. For example, the slit 5411 may be used to prevent the third substrate 5410 from being finely cracked when the opening 5408 is formed. However, the present disclosure is not limited in this regard. For example, in some embodiments, the slit 5411 may be formed to have a depth ranging from about 60% to about 70% of a thickness of the third substrate 5410.

In some embodiments, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some embodiments, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the wordline bonding region WLBA. Since the insulating material 5413 is formed in the slit 5411, it may be possible to prevent a voltage provided through the second input/output pad 5405 from affecting a metal layer disposed on the third substrate 5410 in the wordline bonding region WLBA.

In some embodiments, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, and/or to include only the third input/output pad 5406 disposed on the upper insulating layer 5401.

In some embodiments, at least one of the second substrate 5310 of the first cell region CREG1 and the third substrate 5410 of the second cell region CREG2 may be used as a sacrificial substrate and may be completely and/or partially removed before and/or after a bonding process. An additional layer may be stacked after the removal of the substrate. For example, the second substrate 5310 of the first cell region CREG1 may be removed before and/or after the bonding process of the peripheral circuit region PREG and the first cell region CREG1. Subsequently, an insulating layer covering a top surface of the common source line 5320 or a conductive layer for connection may be formed. Similarly, the third substrate 5410 of the second cell region CREG2 may be removed before and/or after the bonding process of the first cell region CREG1 and the second cell region CREG2, and subsequently, the upper insulating layer 5401 covering a top surface of the common source line 5420 or a conductive layer for connection may be formed.

Figure 30:
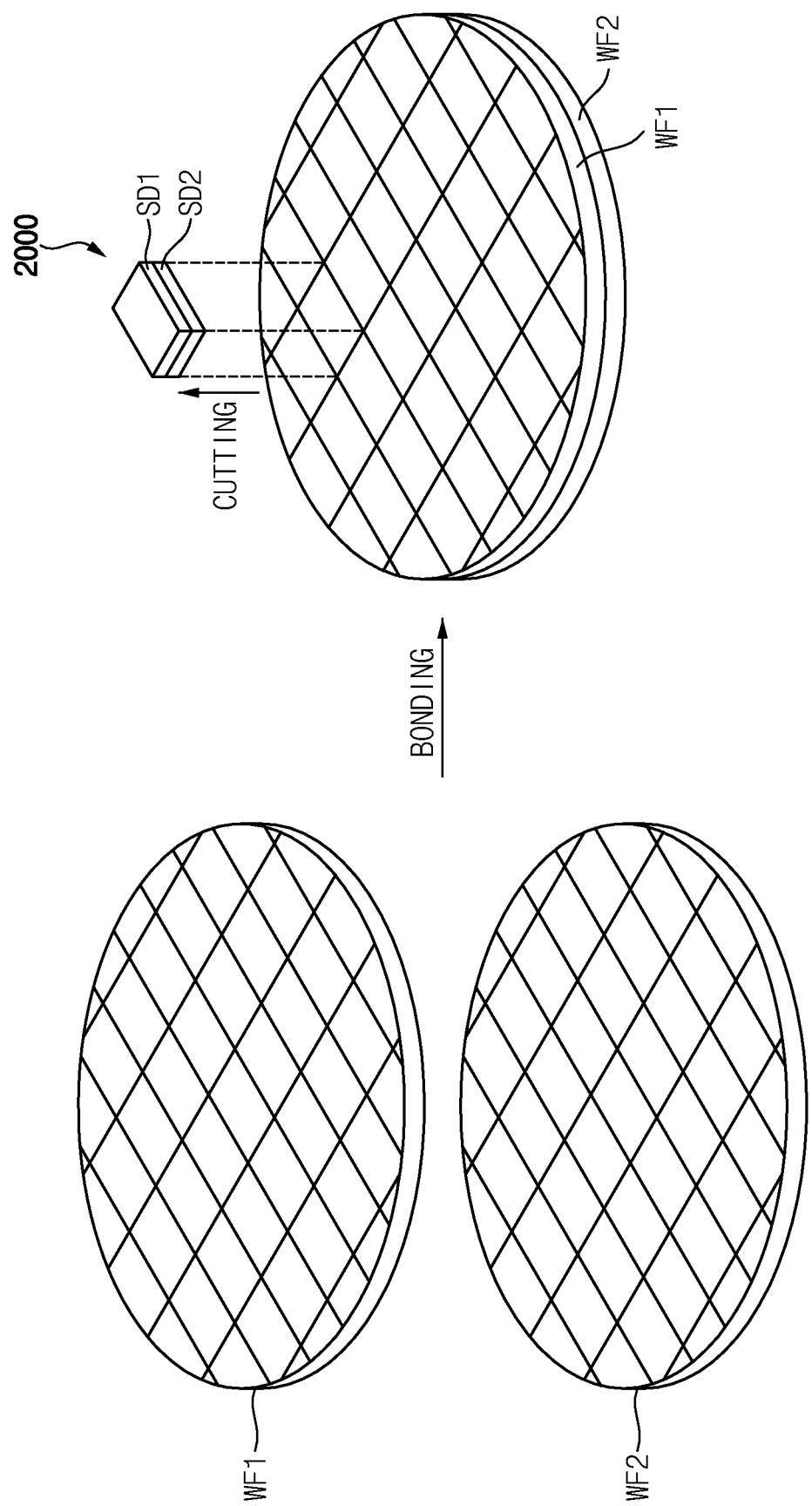
FIG. 30 is a conceptual diagram illustrating manufacturing processes of a stacked semiconductor device according to one or more example embodiments.

FIG. 30 is a conceptual diagram illustrating manufacturing processes of a stacked semiconductor device according to one or more example embodiments.

Referring to FIG. 30, respective integrated circuits may be formed on a first wafer WF1 and a second wafer WF2. The memory cell array may be formed in the first wafer WF1 and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the nonvolatile memory device 2000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1 and each cut portion of the second wafer WF2 corresponds to the second semiconductor die SD2. The memory device of FIG. 29 may be manufactured according to the process of FIG. 30.

As described above, the nonvolatile memory device and a method of controlling a nonvolatile memory device according to one or more example embodiments may effectively reduce disturbance between the memory cells and enhance the retention characteristics of the nonvolatile memory device, by performing the preprogram operation with selecting over-erased memory cells before performing the data program operation. Reliability of the nonvolatile memory device may be efficiently improved without deterioration in performance of the nonvolatile memory device by performing the preprogram operation while write data is transferred and state-bit mapping is performed.

The present disclosure may be applied to electronic devices and/or systems requiring transfer of high voltages such as a nonvolatile memory device. For example, the present disclosure may be applied to systems such as, but not limited to, a memory card, a solid state drive (SSD), an embedded multimedia card (eMMC), a universal flash storage (UFS), a mobile phone, a smartphone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an Internet of Things (IoT) device, an Internet of Everything (IoE) device, an e-book, a virtual reality (VR) device, an augmented reality (AR) device, a server system, an automotive driving system, and the like.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A method of controlling a nonvolatile memory device, the method comprising:
   determining, based on a write address, whether selected memory cells of the nonvolatile memory device corresponding to the write address are included in an over-erased group;
   based on the selected memory cells being included in the over-erased group, performing a preprogram operation to increase threshold voltages of an over-erased state of the selected memory cells; and
   after completion of the preprogram operation, performing a data program operation to store write data in the selected memory cells,
   wherein the preprogram operation comprises decreasing a preprogram voltage applied to a selected wordline corresponding to the write address during the preprogram operation, as a distance between a selected string selection line corresponding to the selected memory cells and a wordline cut area decreases.

2. The method of claim 1, wherein the preprogram voltage applied to a selected wordline corresponding to the write address during the preprogram operation is lower than a data program voltage applied to the selected wordline during the data program operation.

3. The method of claim 1, wherein a preprogram pass voltage applied to non-selected wordlines, other than a selected wordline corresponding to the write address, during the preprogram operation is lower than a data program pass voltage applied to the non-selected wordlines during the data program operation.

4. The method of claim 1, wherein a pre-verification read voltage applied to a selected wordline corresponding to the write address during the preprogram operation is lower than a data verification read voltage applied to the selected wordline during the data program operation.

5. The method of claim 1, wherein the write address corresponds to a physical address of the nonvolatile memory device, and
   wherein the determining whether the selected memory cells are included in the over-erased group comprises determining whether the selected memory cells are included in the over-erased group based on a physical position of the selected memory cells.

6. The method of claim 1, wherein the determining whether the selected memory cells are included in the over-erased group comprises:

determining on a second distance between channel holes including the selected memory cells and the wordline cut area; and determining, based on the second distance, whether the selected memory cells are included in the over-erased group.

7. The method of claim 1, wherein the determining whether the selected memory cells are included in the over-erased group comprises:

based on a selected string selection line that corresponds to the selected memory cells corresponding to an outermost string selection line that is closest to a the wordline cut area, determining that the selected memory cells are included in the over-erased group; and based on the selected string selection line not corresponding to the outermost string selection line, determining that the selected memory cells are not included in the over-erased group.

8. The method of claim 1, wherein the determining whether the selected memory cells are included in the over-erased group comprises:

based on channel holes including the selected memory cells corresponding to outermost channel holes closest to a the wordline cut area, determining that the selected memory cells are included in the over-erased group; and based on the channel holes including the selected memory cells not corresponding to the outermost channel holes, determining that the selected memory cells are not included in the over-erased group.

9. The method of claim 1, wherein the determining whether the selected memory cells are included in the over-erased group comprises:

determining whether the selected memory cells are included in the over-erased group, based on an interval between a selected wordline corresponding to the write address and a neighboring wordline adjacent to the selected wordline.

10. The method of claim 1, wherein the determining whether the selected memory cells are included in the over-erased group comprises:

based on an interval between a selected wordline corresponding to the write address and a neighboring wordline adjacent to the selected wordline being smaller than a reference interval, determining that the selected memory cells are included in the over-erased group; and based on the interval between the selected wordline and the neighboring wordline being greater than the reference interval, determining that the selected memory cells are not included in the over-erased group.

11. The method of claim 1, wherein performing the preprogram operation comprises:

performing a pre-verification operation by applying a pre-verification read voltage to the selected wordline corresponding to the write address to determine over-erased memory cells having threshold voltages lower than the pre-verification read voltage among the selected memory cells; and after the performing the pre-verification operation, performing a preprogram execution operation by applying the preprogram voltage to the selected wordline to increase the threshold voltages of the over-erased memory cells.

12. The method of claim 11, wherein the pre-verification read voltage is lower than a data verification read voltage corresponding to a lowest program state of the data program operation, and wherein the preprogram voltage is lower than a data program voltage corresponding to the lowest program state of the data program operation.

13. The method of claim 11, wherein the selected memory cells having the threshold voltages lower than the pre-verification read voltage are determined as the over-erased memory cells regardless of the write data.

14. The method of claim 11, further comprising repeatedly performing the pre-verification operation and the preprogram execution operation while increasing the preprogram voltage in a step-by-step manner.

15. The method of claim 1, wherein the preprogram operation is performed during the nonvolatile memory device receives the write data from a host device.

16. The method of claim 1, wherein, when the selected memory cells are not included in the over-erased group, the preprogram operation is omitted and only the data program operation is performed.

17. A method of controlling a nonvolatile memory device, the method comprising:

determining, based on a write address, whether selected memory cells of the nonvolatile memory device corresponding to the write address are included in an over-erased group;

based on the selected memory cells being included in the over-erased group, performing a preprogram operation to increase threshold voltages of an over-erased state of the selected memory cells; and after completion of the preprogram operation, performing a data program operation to store write data in the selected memory cells, wherein a time point of starting the data program operation is uniform regardless of whether the preprogram operation is performed or omitted.

18. A nonvolatile memory device comprising:

a memory cell array comprising a plurality of memory cells; and a control circuit configured to:

based on selected memory cells corresponding to a write address being included in an over-erased group, perform a preprogram operation to increase threshold voltages of an over-erased state of the selected memory cells, and after performing the preprogram operation, performing a data program operation to store write data in the selected memory cells, wherein the preprogram operation comprises decreasing a preprogram voltage applied to a selected wordline corresponding to the write address during the preprogram operation, as a distance between a selected string selection line corresponding to the selected memory cells and a wordline cut area decreases.

* * * * *